United States Patent [19]

Miyahara et al.

[11] 4,083,626
[45] Apr. 11, 1978

[54] REAR PROJECTION SCREENS

[75] Inventors: Junji Miyahara; Hisatoyo Kato, both of Minami-ashigara, Japan

[73] Assignee: Fuji Photo Film Co., Ltd., Minami-ashigara, Japan

[21] Appl. No.: 672,930

[22] Filed: Apr. 2, 1976

[30] Foreign Application Priority Data

| Apr. 4, 1975 | Japan | 50-41710 |
| Aug. 1, 1975 | Japan | 50-9386 |
| Sep. 4, 1975 | Japan | 50-107232 |
| Sep. 4, 1975 | Japan | 50-107233 |
| Sep. 4, 1975 | Japan | 50-107234 |
| Sep. 3, 1975 | Japan | 50-106766 |
| Jul. 31, 1975 | Japan | 50-106077 |
| Aug. 1, 1975 | Japan | 50-106689 |
| Nov. 19, 1975 | Japan | 50-156938 |
| Nov. 19, 1975 | Japan | 50-156939 |

[51] Int. Cl.² ............................................. G03B 21/56
[52] U.S. Cl. ............................................. 350/117
[58] Field of Search ............................. 350/117–129

[56] References Cited

U.S. PATENT DOCUMENTS

| 3,351,409 | 11/1967 | McGuire | 350/117 |
| 3,527,519 | 9/1970 | Reitman | 350/117 |
| 3,653,740 | 4/1972 | Ogura et al. | 350/117 |
| 3,674,338 | 7/1972 | Cartmell et al. | 350/117 |
| 3,779,630 | 12/1973 | Clausen et al. | 350/117 |
| 3,832,031 | 8/1974 | Land | 350/117 |

*Primary Examiner*—Richard A. Wintercorn
*Attorney, Agent, or Firm*—Sughrue, Rothwell, Mion, Zinn and Macpeak

[57] ABSTRACT

Rear projection screens of superior mechanical and optical properties are described which comprise, in all instances, at least one light diffusion layer and at least one transparent support, an intermediate layer being provided between the light diffusion layer and the transparent support, which intermediate layer is formed from a photocurable composition.

17 Claims, 11 Drawing Figures

REAR PROJECTION SCREENS

BACKGROUND OF THE INVENTION

1. FIELD OF THE INVENTION

The present invention relates to a rear projection screen, more particularly, to a rear projection screen satisfactory in both optical properties and mechanical properties.

2. DESCRIPTION OF THE PRIOR ART

In general, a rear projection screen comprises a light diffusion layer and a transparent support, although rear projection screens including both these elements and rear projection screens consisting of a light diffusion layer alone are known. At present, the latter type of rear projection screens are most commonly used.

The term "light diffusion layer" designates a layer having the action of diffusing light. For instance, (a) a diffusion layer having a surface in the form of a mat such as ground glass (hereinafter referred to as a "mat type diffusion layer"), (2) a diffusion layer prepared by dispersing light scattering particles in a transparent binder (hereinafter referred to as a "dispersion type diffusion layer"), (3) a diffusion layer prepared by coating an organic binder with light scattering particles dispersed therein onto a transparent sheet such as a glass plate (hereinafter referred to as a "coating type diffusion layer"), (4) a diffusion layer comprising a wax sheet, (5) a diffusion layer comprising a polymeric material sheet, etc., are known.

The term "transparent support" designates a layer serving to improve the mechanical properties and the optical properties of a diffusion layer. For instances, (a) a transparent plate such as a glass plate, an acrylic resin plate, etc., (b) a surface optical element plate having on a transparent sheet a surface microoptical element structure in the form of a Fresnel lens, lenticular lens, V-groove, or the like, (c) a transparent plastic sheet having a venetian blind-like louver structure (hereinafter merely referred to as an "LCF"), etc., are known.

At present, as described above, rear projection screens consisting of a light diffusion layer alone are often commonly used. However, this type of rear projection screen is not always satisfactory in both optical and mechanical properties.

As is described in detail in U.S. patent application Ser. No. 654,830 filed on Feb. 3, 1976, although a mat type diffusion layer, a dispersion type diffusion layer (for example, as described in U.S. Pat. No. 2,180,113), a coating type diffusion layer, etc., are fairly satisfactory in mechanical properties, their optical properties such as scintillation, image reproduction range, light redistribution capability, resolving power, etc., are not satisfactory.

On the other hand, in the case of a diffusion layer comprising a wax sheet, the optical properties thereof are excellent, but the mechanical properties thereof are markedly inferior. Thus, it has been difficult to use a wax sheet alone as a light diffusion layer.

Although a polymer light diffusion layer is slightly inferior to a wax light diffusion layer in optical properties, the polymer light diffusion layer has the advantages over the wax light diffusion layer in that its mechanical strength is excellent, its surface hardness is high, and workability is good.

Hence, attempts have been made to produce rear projection screens not only from a light diffusion layer comprising wax alone but to use such a light diffusion layer comprising wax and a transparent support such as a glass plate, etc., together. However, since wax generally has low affinity to a transparent support such as a glass plate, etc., even though if a layer of wax is provided on the glass plate by coating as in a coating type diffusion layer, the wax layer peels or cracks with ease. Thus, in general, rear projection screens having a sandwich structure in which a wax diffusion layer is sandwiched between two transparent supports such as glass plates, etc., have been used.

With a sandwich structure, however, the affinity of a wax diffusion layer to a transparent support such as a glass plate, etc., is not improved, and thus the wax layer peels or air bubbles enter into the interface with the passage of time, resulting in insufficient durability of the rear projection screen. Moreover, since such a sandwich structure has interfaces of different refractive indexes (different interfaces) on both sides of the light diffusion layer, light is refracted and reflected, resulting in a loss of light, and thus the excellent optical properties of the wax are undesirably deteriorated.

Japanese Utility Model No. 21,110/1969 discloses a rear projection screen wherein a wax light diffusion layer is sandwiched between transparent members such as glass plates, etc., and Japanese Utility Model No. 14,236,1968 discloses a rear projection screen wherein a polymer light diffusion layer is sandwiched between transparent supports, such as glass plates.

with such rear projection screens, however, since their light redistribution capability is limited by the diffusion capability of the wax or polymer light diffusion layer, it has been quite difficult to redistribute the light passed through the rear projection screen to the desired range.

That is to say, it is, in general, not necessary that the light redistribution capability of a rear projection screen be equal in all directions, and it is often desired to redistribute light to a certain specific range from the viewpoint of efficiently utilizing the light passed through the light diffusion layer. For instance, where a plurality of viewers view an image projected onto the rear projection screen at the same time, it is important that the diffusion capability in the horizontal direction be larger than that in the vertical direction, whereas when a single viewer views an image on the rear projection screen from fixed position, it is preferred that transmitted light be focussed only at the observation range of the viewer, since the transmitted light can be efficiently utilized. In rear projection screens with the above sandwich structure, however, the light redistribution capability is limited by the diffusion capability of the wax diffusion layer, thereby making it quite difficult to meet the above requirements.

Moreover, a desired rear projection screen is required to faithfully reproduce the image of an original microfilm, that is, pattern, color tone, and contrast. Irrespective of these requirements, however, no consideration has hitherto been paid to these points by the art. Hence the art has never chosen color tone so as to faithfully reproduce color images, although the color tone has been chosen to harmonize with that in the room where viewing is conducted or to reduce eye fatigue.

Further, while a light diffusion layer comprising a polymeric material sheet is fairly satisfactory in optical properties (next to wax), its mechanical strength is still insufficient, and, as in the case of wax, a light diffusion layer comprising a polymeric material sheet has generally been sandwiched between transparent supports such as glass plates, as described in, for example, Japanese Utility Model Publication No. 14,236/1968.

Problems also occur in this case in that the above optical defects inherent to a sandwich structure are inevitably caused and in that air bubbles enter into the interface with the passage of time due to the insufficient affinity of the polymeric material sheet to the glass plates, and thus it has been quite difficult to provide such rear projection screens satisfactory in both optical properties and in mechanical properties.

It could be considered, therefore, to produce a light diffusion layer, particularly a wax diffusion layer or polymeric material sheet, and a transparent support from materials having affinity to each other in order to bring both into direct contact without employing a sandwich structure as is shown in FIG. 1, thereby removing the above described defects. It has been, however, quite difficult and, for practical purposes, impossible, to select the materials of the light diffusion layer and the transparent support in such a way that they have good affinity for each other. This is because the materials of the light diffusion layer and the transparent support are principally selected taking into consideration the optical properties of both, as a result of which their affinity is given no or almost no consideration.

Further, in Japanese Utility Model Publication No. 14,236/1968, since the thickness of the transparent support used is high, stiffness is high, (though not disclosed, typically 2 to 5 mm would be conventional) if the difference in the coefficient of thermal expansion between polymer diffusion layer and the transparent support is high, stress due to the difference is coefficient of thermal expansion results at the interface between the polymer diffusion layer and the transparent support due to the heat applied during the use thereof. Thus, problems can arise in that shearing occurs at the interface therebetween and the rear projection screen itself can be broken.

Similar disclosure occurs in Japanese Utility Model No. 21,110/1969, i.e., a wax diffusion layer is bonded between transparent supports, and the transparent supports utilized have a thickness on the order of 2 to 5 mm, i.e., stress is generated due to the difference in coefficient of thermal expansion between the wax diffusion layer and the transparent support due to the heat applied during the use thereof.

In all of the above systems wherein stress generation is a problem, this is primarily due to the fact that diffusion layers and transparent supports have been selected primarily from the viewpoint of their optical properties, with little attention being given to minimizing any difference in coefficient of thermal expansion therebetween.

Moreover, when the light diffusion layer and the transparent layer are bonded to each other using an intermediate layer, it is a difficult problem to select a material for the intermediate layer which permits the most effective functioning of the rear projection screen without deteriorating the functions thereof.

In brief, as described above, it has been quite difficult to provide rear projection screens satisfactory in both mechanical and optical properties by bonding a light diffusion layer and a transparent support directly.

SUMMARY OF THE INVENTION

A basic object of all embodiments of this invention is to provide rear projection screens having satisfactory optical and mechanical properties.

Another object of the present invention is to provide rear projection screens which are free from the above drawbacks of the prior art and which have excellent mechanical properties as well as excellent optical properties.

The above objects are attained by providing an intermediate layer between a light diffusion layer and a transparent support.

Another object of the present invention is to provide rear projection screens which can be used for various purposes, which are of high durability and which can be produced with ease, which object is most effectively attained by sandwiching a light diffusion layer between transparent supports having a thickness of not more than 0.5 mm via intermediate layers comprising a photocurable composition.

Yet another object of the present invention is to provide rear projection screens which are capable of faithfully reproducing color images of continuous gradation. This object of the present invention is most effectively attained by bonding a light diffusion layer and a transparent support through an intermediate layer comprising a photocurable composition to thereby produce a rear projection screen, and by coloring the rear projection screen until its color temperature conversion ability reaches a color tone having a Mired shift value of about $-5$ to about $-120$ and which is neutrally darkened until its transmittance reaches about 40 to about 70%. (Hereafter, such a "colored" rear projection screen will sometimes be termed a "CRPS" (colored rear projection screen) for purposes of brevity.)

Still yet a further object of the present invention is to provide rear projection screens having excellent light redistribution capabilities, which rear projection screens have excellent color image reproduction capability. These objects of the present invention are effectively attained by sandwiching a light diffusion layer between a transparent support with a micro-optical element structure on the surface thereof facing the light source and a transparent support which has a color tone having a Mired shift value of about $-5$ to about $-120$ which is neutrally darkened until the transmittance thereof as a whole reaches about 40 to about 70%, to thereby produce a rear projection screen, the light diffusion layer and supports being bonded by an intermediate layer of a photocurable composition. This embodiment is a more specific embodiment of the CRPS earlier described.

Yet another object of this invention is to provide rear projection screens which are especially suitable for simultaneous observation of a projected image by a plurality of viewers or for viewing by a single viewer, wherein in the former case there is provided a light diffusion layer the surface on the light source side of which there is a V-groove lenticular lens structure of certain characteristics and in the latter case there is provided a Fresnel lens structure of particular characteristics, wherein the light diffusion layer is bonded to a transparent support via an intermediate layer comprising a photocurable composition.

Still yet a further object of the present invention is to provide a rear projection screen which is suitable for viewing by single viewer as described in the preceding paragraph which has excellent color image capability, which objects are efficiently attained by forming a rear projection screen by bonding a light diffusion layer, the surface on the light source side of which there is a Fresnel lens structure with about a 0.03 mm to about a 1 mm pitch and about a 20 cm to about a 100 cm focal length, and a transparent support which has a mired shift value and a transmittance as earlier described for the CRPS, through an intermediate layer comprising a photocurable composition.

Yet another object of this invention is to provide rear projection screens which are especially suitable for simultaneous observation by a plurality of viewers and which have excellent color image reproduction capability, these objects of the present invention being effectively attained by forming a rear projection screen by bonding a light diffusion layer, the surface on the light source side of which has a V-groove lenticular lens structure with about a 0.03 mm to about a 1 mm pitch and about a 90° to about a 150° top angle, most preferably a top angle of 100 to 130°, and a transparent support which has a mired shift value and a transmittance as earlier defined for the CRPS, through an intermediate layer comprising a photocurable composition.

BRIEF DESCRIPTION OF THE DRAWINGS

In all Figures, where appropriate, a light source is generally indicated as such and a viewer is generally indicated as such to enable one skilled in the art to fully appreciate the embodiment under consideration. In FIGS. 4 and 5, the light source and the viewer direction are same as those in FIG. 3.

DETAILED DESCRIPTION OF THE INVENTION

The term "wax" as used herein includes those materials disclosed in U.S. patent application Ser. No. 644,683, filed on December 29, 1975, and entitled Rear Projection Screens, which corresponds to Japanese Patent Application 446/1975.

To improve the brittleness of the wax of the present invention, a wax reforming agent as is disclosed in U.S. patent application Ser. No. 644,683 (which corresponds to Japanese Patent Application No. 446/1975) may be added as disclosed in the referenced U.S. Application in the amounts as disclosed therein. The addition of such a wax reforming agent eliminates brittleness of the wax and enables one to produce a sheet from the wax alone, thereby simplifying production and making it possible to produce a rear projection screen at low cost.

The term "crystalline polymer" as is used herein includes those polymers disclosed in U.S. application Ser. No. 654,830 filed on Feb. 3, 1976 and entitled Rear Projection Screens, which corresponds to Japanese patent application 14,541/1975.

Since the use of a wax and/or crystalline polymer light diffusion layer offers the greatest benefits in the practice of the present invention, such will often be referred to hereinafter for purposes of illustrating the invention.

The terms "transmittance" or "luminous transmittance with illuminant C" as are used herein refer to the luminous transmittance determined using CIE standard illuminant C.

The terms "light diffusion layer" or "diffusion layer" are used interchangeably to refer to a light diffusion layer.

Figure 2:
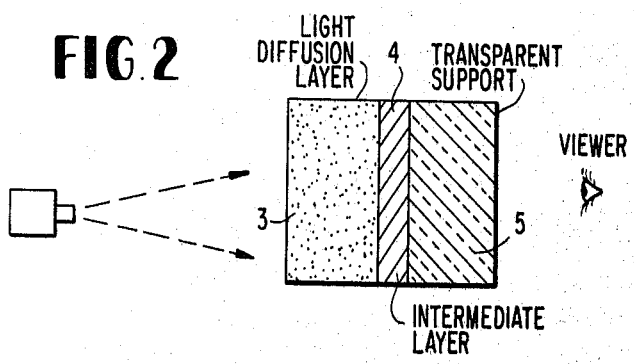
FIG. 2 schematically illustrates the structure of a rear projection screen in accordance with the present invention.

The term "intermediate layer" designates a layer provided between a light diffusion layer and a transparent support. The provision of such an intermediate layer in the manner as shown in FIG. 2 enables one to increase the mechanical properties of the rear projection screen while preventing a decrease in the optical properties of the rear projection screen due to directly contacting the light diffusion layer and the transparent support. This is because while it is quite difficult to select each of the materials of the light diffusion layer and the transparent support taking into account their affinity to each other as well as their optical properties, it is far easier to first select a light diffusion layer and a transparent support taking into account their optical properties and then to select a material having affinity to the both as a material for the intermediate layer.

Moreover, it is notable that the provision of such an intermediate layer is able to provide the rear projection screen with better mechanical properties than in the case of direct adhesion of a light diffusion layer and a transparent support. That is, in general, the bending stress due to external forces and stress caused by the differences in their coefficients of thermal expansion are generated between the light diffusion layer and the transparent support due to variations in temperature, and, thus, when they are directly bonded the stress exerted on one of them is directly transferred to the other and there is the possibility of a diffusion layer of low mechanical strength, in particular, being broken. However, where an intermediate layer is provided between the light diffusion layer and the transparent support, the intermediate layer absorbs the stress exerted on each layer, thereby making it possible to prevent the light diffusion layer from being broken, and thus such rear projection screens show increased mechanical properties as compared with ones in which no intermediate layer is used.

A more important matter is that it is possible to change the optical properties of the light diffusion layer by bonding the light diffusion layer through the intermediate layer to the transparent support. That is to say, the selection as the transparent support of materials having specific optical properties makes it possible for the rear projection screen as a whole to exhibit excellent optical properties as compared with those in which the light diffusion layer alone is used since the optical properties of the transparent support can compensate for insufficient optical properties of the light diffusion layer.

The above described effect of increasing mechanical strength using the transparent support is applicable to light diffusion layers comprising a wax sheet or a crystalline polymer. Thus, the present invention enable one to increase both optical and mechanical properties.

As is apparent from the above explanation, the intermediate layer of the present invention is required to meet the following requirements:

(1) it is optically transparent;
(2) it contains no air bubbles;
(3) it is a uniform and thin layer;
(4) it has a refractive index near to those of the light diffusion layer and the transparent support, more preferably intermediate therebetween;
(5) it is made of a material capable of relaxing the mechanical bending stress or the stress due to the difference in the coefficient of thermal expansion between the light diffusion layer and the transparent support;
(6) it has affinity to both the light diffusion layer and the transparent support; and
(7) it is not subjected to deterioration due to heat, light, or the atmosphere.

Actually, quite difficult problems are encountered in selecting the material for the intermediate layer for which the above properties are required.

For instance, solvent type adhesives widely used cannot be used as the intermediate layer for the rear projection screen of the present invention in which the solvent hardly evaporates from the system, since these adhesives cure on evaporation of the solvents. In addition, epoxy resin based adhesives cannot be used since they are highly viscous and inevitably give rise to air bubbles in the intermediate layer during the formation thereof.

It has been found that as materials constituting the intermediate layer there can be most suitably used those liquid photocurable compositions whose polymerization is initiated by light.

Liquid photocurable compositions which can be used in the present invention are liquid compositions containing photopolymerizable monomers or oligomers as required components. The photopolymerizable monomers or oligomers utilized in the present invention preferably contain at least one ethylenically unsaturated double bond. These photopolymerizable monomers include photopolymerizable acrylic acid or acrylates, methacrylic acid or methacrylates, acrylamides, vinyl esters, N-vinyllactams (N-vinyl pyrrolidone, N-vinyl caprolactam), N-vinyl pyridines, maleic acid or maleates, fumaric acid or fumarates, aromatic vinyl derivatives (styrene and vinyl toluene), vinyl ethers, and the like. Particularly preferred for use in the present invention are nonvolatile high boiling point monomers such as unsaturated esters of polyols, e.g., ethylene glycol monoacrylate or monomethacrylate, diethylene glycol monoacrylate or monomethacrylate, polyethylene glycol monoacrylate or monomethacrylate, glycidyl acrylate or methacrylate, ethylene diacrylate or dimethacrylate, triethylene glycol diacrylate or dimethacrylate, polyethylene glycol $\alpha,\omega$-diacrylate or dimethacrylate, trimethylolpropane triacylate or trimethacrylate, pentaerythritol triacrylate or trimethacrylate, and unsaturated amides of polyamines, e.g., a diacrylamide or methacrylamide of $\alpha,\omega$-diamine, methylenebisacrylamide or methacrylamide, and the like. Preferred high boiling point monomers have a boiling point of at least 100° C, even more preferably 200° C or higher.

As acrylamides, N,N-dimethyl acrylamide and N,N-diethyl acrylamide can be used. In addition to photopolymerizable monomers, oligomer type compounds having an appropriate molecular weight (usually a molecular weight of about 500 to about 5,000) can be used. For instance, maleic acid of fumaric acid based unsaturated polyester oligomers, i.e, where maleic acid or fumaric acid is present as an acid component of the polyester, in particular, ether bond containing gylcols, e.g., diethylene glycol, triethylene glycol, tetraethylene glycol, polyethylene glycol, polytetramethylene oxide glycol, etc., and maleic acid or fumaric acid based oligopolyesters or copolymers thereof, etc., are useful.

As the liquid photocurable composition for use in the intermediate layer of the present invention, the above photopolymerizable, high boiling point, nonvolatile monomers or oligomers can be used singly. In general, however, it is preferred to utilize one or more oligomers in combination with one or more photopolymerizable monomers; in this case, any mixing ratio can be used.

It is preferred to adjust the viscosity of the liquid photocurable composition to one easily workable so that air bubbles, contaminations, and the like are eliminated in laminating the light diffusion layer and the transparent support to thereby provide as uniform an intermediate layer as possible. In general, when the viscosity of the composition is about 10 to about 10,000 cps at ordinary room temperature (25° C), the operations of defoaming and lamination can be effected without any hindrance. Particularly preferred viscosities are from 50 to 1,000 cps. In addition to variations in the combination of the monomer(s) and the oligomer(s), it is possible to adjust the viscosity by adding suitable binders such as cellulose esters, e.g., acetylcellulose, acetylphthalyl cellulose, acetylcellulose hydrogen succinic acid ester, alkali soluble polyvinyl alcohol derivatives such as polyvinyl hydrogen oxalate, polyvinyl hydrogen phthalate, polyvinyl hydrogen succinate, etc., polyvinyl hydrogen oxalate, polymers or copolymers containing acrylic acid or methacrylic acid as a monomer (for example, homopolymers thereof or a copolymer of methyl methacrylate/acrylonitrile/acrylated glycidyl acrylate), a vinyl chloride-vinyl acetate copolymer, and the like. Preferred binders have a molecular weight up from about 5,000 to about 500,000, though as will be apparent to one skilled in the art, this is not limitative and a lesser viscosity adjustment can be effected using a binder of lower molecular weight and a greater viscosity adjustment effective using a binder of a higher molecular weight.

To control the coating properties and adhesion strength of the intermediate layer after curing, suitable plasticizers can be added, if desired, preferably an organic or inorganic ester group containing plasticizer. Useful plasticizers include phthalic acid based esters, e.g., di-octyl phthalate and dibutyl phthalate, phosphoric acid based esters, e.g., tricresyl phosphate and tributyl phosphate, castor oil, linseed oil, safflower oil, glycerin ester based plasticizers such as triacetin, etc. When such plasticizers are used, they are generally added in an amount of from about 0.5 to about 15 wt% of the coating composition involved, even more preferably 1 to 5 wt%.

While these photocurable compositions can be cured by the application of heat and/or light, light sensitizing agents may be added thereto for more efficient curing, though the use of light sensitizing agents is not mandatory.

These light sensitizing agents include benzoin, benzoin methyl ether, benzoin ethyl ether, benzyl, diacetyl, benzophenone or its derivatives, e.g., methyl benzophenone, methoxy benzophenone, chlorobenzophenone, benzophenone carboxylic acid, etc., anthraquinone, or its derivatives, e.g., methyl anthraquinone, ethyl anthraquinone, etc., azonitriles, e.g., azo-bis-isobutyronitrile, azo-bis-valeronitrile, etc., and the like.

The amount of light sensitizing agent added is from about 0.01 to about 10% by weight, preferably from 0.1 to 5% by weight, of the photopolymerizable monomer(s) and/or oligomer(s). The addition of the light sensitizing agent enables one to shift the light sensitive wavelength range to the long wavelength side, and thus it is possible to polymerize photocurable compositions by the use of lamps on the market having a wavelength of 280 to 460 m$\mu$. If lamps capable of emitting light of a shorter wavelength can be utilized as the lamp for the initiation of polymerization, the amount of the sensitizing agent added can be reduced or no sensitizing agent added.

In the case that the photocurable composition is sensitive to light only in the short wavelength region, it is possible to effect the production of the rear projection screen in ordinary sun light, and, at the same time, the photocurable composition is subject to no further polymerization and curing during the use of the rear projection screen after the production thereof. Thus, this case is rather preferred.

To the liquid photocurable composition there can be added heat polymerization inhibitors for the stable storage thereof, if desired. For instance, those well known polymerization inhibitors such as hydroquinone or its derivatives, e.g., hydroquinonemonomethylether, catechol, benzoquinone, nitrobenzene, naphthylamine, pyridine, and the like can be used. The amount of the polymerization inhibitor added is from about 50 to about 1,000 ppm of the photopolymerizable monomer(s) and/or oligomer(s), when used.

Photocurable compositions as used herein can be, as described above, prepared with ease by mixing photocurable monomers, oligomers, and if desired or necessary, suitable additives. Similar compositions are described in Japanese Patent Publication No. 19,125/1968, Japanese Patent Applications Nos. (OPI) 130,984/1974 and 128,088/1974, Japanese Patent Publication No. 29,525/1971, U.S. Pat. Nos. 3,168,404 and 3,252,800, etc. For the purposes of the present invention, heat curable functional oligoesteracrylates produced by Toa Gosei Chemical Industry Inc., Co., under the trade name of AROMIX can be used in combination with suitable photopolymerization sensitizing agents, for instance, ARONIX M-5500, ARONIX M-5700, ARONIX M-6100, ARONIX M-6300, etc. In addition, PHOTO BOND produced by Meisei Churchill Co. and SONNE produced by Kansai Paint Co., Ltd. can be used.

As materials constituting intermediate layers of the present invention there can be used any photocurable composition, and, in particular, the above compositions can be effectively used although the present invention is not limited thereto. Although it could be considered to cure these photocurable compositions by the action of suitable heat polymerization initiators, the present invention is characterized in that a firm intermediate layer is obtained by irradiation of light, particularly without applying such severe conditions as to apply heat. Curing by the application of heat suffers from the disadvantages that the irregularity of the intermediate layer due to the incorporation of air bubbles, and shrinkage, lines, etc., are caused, and it takes a long time for heat curing.

Since these photocurable compositions undergo no polymerization reaction by the application of visible rays or at least visible rays at the long wavelength side, there are few limitations on the operation of bonding the light diffusion layer and the transparent support by the use of the photocurable composition as the intermediate layer.

As will be clear to one skilled in the art, the wavelength, intensity and time of exposure required for curing change depend upon the kind of photocurable composition.

It is desirable that the intermediate layer comprising the photocurable composition be bonded in the relatively soft state, i.e., in an adhesive state rather than being highly solidified, in that the stress exerted on the light diffusion layer can be relaxed. It is, therefore, preferred to appropriately choose the composition of the photocurable composition. For instance, the incorporation of commonly used plasticizers such as dimethyl phthalate, diethyl phthalate, dibutyl phthalate, triacetin, and the like, or the further addition of photopolimerizable monomers is effective in achieving such an object.

Although it is necessary to apply light for a period of time to sufficiently polymerize and cure the photocurable composition, it is not necessary to apply light until the composition is completely cured. This is because the chemical reaction proceeds generally along an S curve, and the rate of reaction becomes quite small at the time when the reaction proceeds to a certain extent, and thereafter it hardly proceeds even after a long time. Thus, it is uneconomical and, at the same time, unnecessary to completely finish the polymerization reaction. Since the photopolymerization reaction is quite high in its initial reaction rate and a sufficient degree of polymerization is reached in a quite short time, it is sufficient to apply light for a short time. An acceptable degree of "incomplete polymerization" can easily be determined by simple test: according to JISK 6850 (1972), a shearing breaking test is conducted; when the diffusion layer is broken according to this test, that is a most suitable degree of incomplete polymerization.

One method of complete bonding from the optical and mechanical viewpoints using the intermediate layer comprising a photocurable composition to thereby produce a rear projection screen, is, for example, as follows.

The light diffusion layer and the transparent support are first subjected to a surface treatment, thereby increasing the affinity thereof to the intermediate layer. For this purpose, a surface treatment using solvents such as acetone, methyl ehtyl ketone, toluene, petroleum naphtha, trichloroethylene, and the like, a mechanical surface oxidation treatment using a gas flame, hot air, a mixed solution of sulfuric acid and dichromic acid, a corona discharge, actinic radiation such as ultraviolet rays, X-rays, etc., a plasma jet, etc., a graft polymerization treatment for providing the surface with polar groups, a chemical reaction treatment for providing the surface with polar groups by chemical reaction, and a primer treatment, etc., can be used. While in theory the above "pretreatment" is optional, on a commercial level seldom will rear projection screens in accordance with the present invention be formed without utilizing such a pre-treatment. It is most preferred to utilize a corona discharge. The thus surface treated light diffusion layer and transparent support are bonded using the liquid photocurable composition containing sensitizing agents, stabilizers, and other additives as desired, and previously defoamed by, e.g., a vacuum defoaming method, a supersonic defoaming method, etc. On a commercial level, defoaming of some type will always be conducted so as to improve product quality.

The liquid photocurable composition is placed in the form of bead on the light diffusion layer or transparent support. Then, a part of the other member is brought in contact with the bead like liquid photocurable composition in such a manner that no air bubbles are incorporated therein, and the two plates are then put together in such a manner that the interface of this contact extends in a linear form and the liquid photocurable composition extends, forcing out air at the linear interface. In this case, where one of the two plates can be bent relatively easily (for example, a light diffusion layer comprised of a wax sheet), the above processing can be easily carried out by putting them together while bending the easily bendable one. When the two plates are filled with the photocurable composition therebetween and put together, excess photocurable composition is squeezed with rollers, etc., thereby making the thickness of the intermediate layer uniform. Thereafter, the photocurable composition is cured by irradiating light in the light sensitive wavelength region to which it is sensitive to thereby produce the rear projection screen.

Although the above method can be manually carried out, it goes without saying that apparatus for rapidly effecting the above method can be easily provided by one skilled in the art by reference to prior art lamination technology.

For instance, the liquid photocurable composition can be stored in the form of bead at the edge of one of the plates, and the other plate contacted with the liquid photocurable composition. At the contact area, the two plates are put between two rollers and the photocurable composition is spread between the two plates while rolling the rollers. At the position where the plates come out from the roller zone after being filled with the photocurable composition therebetween and uniformly laminated, light in the light sensitive wavelength region of the composition is applied. If the above system is employed, it is possible to continuously produce rear projection screens by continuously passing two plates between rollers to continuously bond them.

Light irradiation can be carried out using a mercury lamp, a chemical lamp, etc., emitting light in the wavelength region of about 280 to about 460 m$\mu$. In this case, the shape of the lamp may be any of a surface light source, a line light source or a dot light source. Needless to say, the utilization of radiation of this wavelength is not mandatory, and this is merely one mode of irradiation in accordance with the present invention. Other suitable wavelengths can easily be determined by one skilled in the art.

All the steps except for the step in which the photocurable composition is cured should be carried out under a safety lamp, under which no solidification of the photocurable composition occurs.

Since producing the rear projection screen with an intermediate layer can be accomplished by providing an intermediate layer having the above characteristics between a light diffusion layer and a transparent support, it goes without saying that the present invention is not limited to the above described method.

The term "light diffusion layer" as used herein designates a layer having the function of diffusing light, that is, a layer capable of scattering light incident thereupon in the inner portions thereof due to refraction, reflection, diffraction, etc., and of passing the light as transmitted light having a certain light redistribution capability.

(1) Light diffusion layers comprising wax

These layers are composed mainly of wax, in which the wax scatters light.

A "wax" used in this invention is solid having a waxy external appearance and waxy properties at normal room temperature, for example, it is semi-transparent, soft, fragile and non-film-forming. Examples thereof are given below.

(I) Natural wax (supplied from animals and plants) such as Japan wax, carnauba wax or cotton wax (plant wax); insect wax, bees wax or whale wax (animal wax).

(II) Petroleum wax (which is a solid hydrocarbon at normal room temperature obtained from petroleum) such as paraffin wax having a boiling point of not less than 125° F, microcrystalline wax (e.g., Hi-Mic produced by Nippon Seiro Co.).

(III) Synthetic waxes (wax-like solids obtained by synthesis) such as oligomer waxes, e.g., vinyl oligomer waxes such as ethylene oligomer waxes, propylene oligomer waxes; ethylene oxide oligomer waxes, propylene oxide oligomer waxes or a mixture thereof. Ethylene oxide oligomer wax is sold as Carbowax by E. I. Du Pont de Nemours & Co., Inc. vinyl oligomer waxes have a molecular weight of not more than about 10,000, preferably not more than 5,000. The oligomer waxes employed in this invention are solids having a waxy external appearance and waxy properties and have a melt index of not less than about 1,000 (according to the method of JISK 6760 (1971)).

The light diffusion layer may be produced from wax alone. In a more preferred embodiments, the following wax reforming agents are added to increase the mechanical properties and adhesiveness of the wax without losing the optical properties of wax.

(I) Natural substances and derivatives thereof such as rosins (e.g., rosin, modified rosin or rosin esters), terpene resins, terpene phenol resins and other natural resins.

(II) Synthetic resins such as resins containing polar groups (e.g., phenolic resins or xylenic resins), petroleum resins (e.g., aliphatic, alicyclic or aromatic petroleum resins), cumarone indene resins or styrene resins. More preferred materials are ethylene-vinyl acetate copolymers (hereinafter referred to as "EVA"), polyisobutylene (preferred molecular weight: about 35,000 to about 2,100,000), polybutene (preferred molecular weight: about 500 to about 3,000), rosin and atactic polypropylene. Preferred EVA's contain about 15 to about 40 wt% vinyl acetate and have a melt index of about 200 to about 400 (by JISK 6760 (1971)), for example, "Evaflex" manufactured and sold by Mitsui Poly-chemical Co., Ltd. One useful polyisobutylene is available as "Vistanex" manufactured by Esso Co., Ltd.

By adding these wax reforming agents, the mechanical strength and adhesiveness of wax are increased without losing the excellent optical properties which wax inherently has.

(2) Light diffusion layers comprising crystalline polymers

Crystalline polymers as used herein are those polymers having a molecular weight of not less than about 10,000, preferably not less than 20,000, and capable of forming a film by themselves, and those solids containing a structure, a part of all of which shows a crystallization state, such as polyolefins, e.g., polyethylene, polypropylene, and the like, polystyrenes, polycarbonates, polyesters, polyamides, polyurethanes, polyvinyl alcohols, polyesters, polyethers, e.g., polyesters such as polyethylene terephthalate, polyamides such as 6,6-nylon, polyurethanes such as polytetramethylenehexamethyleneurethane, polyethers such as polyoxymethylene, etc., and the like. A light diffusion layer produced from such a material, therefore, is obtained by molding the material into sheet-like form by calendering, extrusion, injection, etc., and at this molding, various treatments are applied to increase the light diffusion capability of the light diffusion layer, such as controlling the cooling rate (see Japanese Utility Model Publication No. 14,236/68), blending polymers whose refractive index is slightly different from the crystalline polymer used as a diffusing material (see Japanese Patent Application (OPI) 106,622/75), blending crystal reforming materials or additives (see U.S. Pat. No. 3,573,141), etc.

It goes without saying that in producing light diffusion layers, wax and crystalline polymers, etc., can be used singly or in combination with each other.

In addition to the above wax modifying agents, those additives as are generally used in fields where wax or crystalline polymers are used can be used as additives for the wax or crystalline polymer of the present invention. For example, antioxidant and ultraviolet ray absorbants can be added for the purpose of improving the stability with time of the wax or crystalline polymer.

Antioxidants as are used in the present invention are required to be soluble in the wax or crystalline polymer and to not substantially deteriorate the optical characteristics of the wax or crystalline polymer.

Preferred phenol-based antioxidants include 4,4-bis-(6-tertiary-butyl-3-methyl-phenol), alkylated bisphenol, 2,4,5-trihydroxybutylophenone, 2,6di-tertiary-butyl phenol, 2,6-ditertiary-butyl-p-cresol (for example, Sumilizer-BHT produced by Sumitomo Chemical Co., Ltd.), 2,2'-methylenebis-(6-tertiarybutyl-4-methyl phenol) (for example, Sumilizer-MDP), 2,6-ditertiary-butyl-α-dimethylamino-p-cresol (for example, "Ethyl Antioxidant 703" produced by Ethyl Corp.), 4,4'-bis-(2,6-ditertiary-butyl phenol) (for example, "Ethyl Antioxidant 712" produced by Ethyl Corp.), 4,4'-methylene-bis-(2,6-di-tertiarybutyl phenol) (for example, "Ethyl Antioxidant 702" produced by Ethyl Corp.), and the like.

Preferred amine-based antioxidants include N,N'-di-α-naphthyl-p-phenylenediamine, and the like; preferred organic phosphorous-based antioxidants include distearylthiodiprodionate, dilauryl thiodipropionate, triazine derivatives such as 2-hydroxyamino-4,6-dimethyl-1,3,5-triazine, 2-mercapto benzoimidazole, and the like.

The amount of antioxidant added when such is used is about 0.005 to about 3.0% by weight, preferably 0.01 to 1.0% by weight, of the total weight of the wax and/or crystalline polymer and all additives. Of course, two or more antioxidants can be used in combination with each other.

On the other hand, ultraviolet ray absorbants used in the present invention are required to be soluble in the wax or crystalline polymer and not to materially deteriorate the optical properties of the wax or crystalline polymer.

Particularly preferred ultraviolet ray absorbants are ultraviolet ray absorbants comprising salicylic acid derivatives, e.g., p-octylphenyl salicylate, and the like; benzophenone based ultraviolet ray absorbants such as 2--hydroxy-4-octoxybenzophenone (for example, R 130 produced by Sumitome Chemical Co., Ltd.), 2-hydroxy-4-octadecyloxy-benzophenone, 4-dodecyloxy-2-hydroxy benzophenone, and the like; benzotriazole based ultraviolet ray absorbants such as 2-(2'-hydroxy-4'-n-octyloxyphenyl)benzotriazole (for example, Sumisoap R 510 produced by Sumitome Chemical Co., Ltd.); nickel-bis-octylphenyl sulfide; substituted acrylonitriles such as β-methoxypropionacrylonitrile; aromatic ester compounds such as 2-hydroxy-5-chlorobenzoic acid-glycidyl ester; organic phosphorous compounds such as a triphenylphosphite ester; sulfur compounds such as 4,4'-thiobis(6-t-butyl-3-ethylphenol); and the like.

The amount of ultraviolet ray absorbant added when such is used is about 0.001 to about 1.0% by weight of the total weight of the wax and/or crystalline polymer and all additives.

These light diffusion layers may be colored so that they absorb light uniformly or selectively, and their surfaces may be matted, or may be in the form of a lenticular lens, Fresnel lens, fly's eye lens, or the like.

The term "transparent support" as is used herein designates those ones shown below.

(1) Transparent supports for use in supporting the light diffusion layer through the intermediate layer to thereby mainly increase the mechanical strength of the light diffusion layer as an effect of the combination, and to thereby prevent the light diffusion layer from being injured by scratches, dust, or mechanical force.

In those instances where the thickness of the transparent support is not overly important, i.e., where the transparent suport need not have a thickness of about 0.5 mm or less, transparent sheets can, in general, be used. Examples of transparent supports of general application include, for instance, a glass sheet, a polyester sheet, an acrylic resin sheet, a polystyrene sheet, a polycarbonate sheet, such as a polyethylene terephthalate or naphthalate sheet, a cellulose acetate sheet, e.g., a cellulose triacetate sheet or cellulose diacetate sheet, a polyimide sheet, a polyolefin sheet such as transparent polyethylene or transparent polypropylene, an LCF, and the like. Among these materials, an acrylic resin, polyvinyl chloride, polyethylene terephthalate, and cellulose triacetate sheet are generally most preferred.

Figure 1:
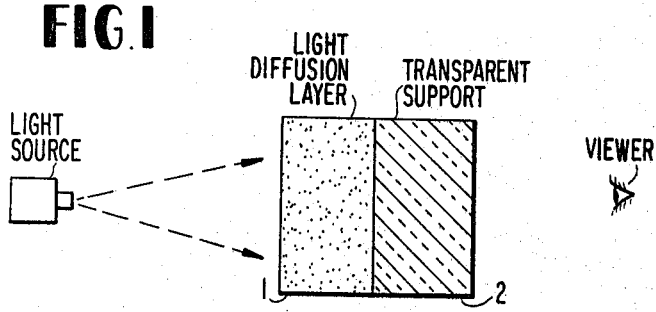
FIG. 1 schematically illustrates one structure of a rear projection screen produced by directly bonding a light diffusion layer to a transparent support.
Figure 3:
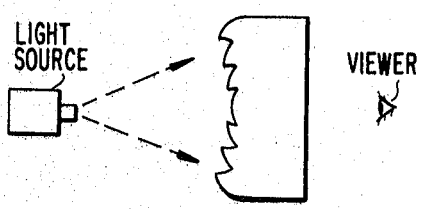
FIGS. 3 to 5 schematically illustrate typical transparent supports for use in a rear projection screen of the present invention.
Figure 4:
Figure 5:

(2) Those supports capable of not only supporting the light diffusion layer to increase the mechanical strength, but also capable of increasing the optical properties of the light diffusion layer by providing to the surface(s) thereof a surface micro-optical element structure in the form of the Fresnel lens as shown in FIG. 3, a lenticular lens as shown in FIG. 4, a fly's eye lens, a V-groove having a V-like section as shown in FIG. 5, or the like.

(3) Transparent plastic sheets having a venetian blind louver structure, i.e., an LCF (as described, for example, in U.S. Pat. No. 2,053,173).

These transparent supports may be colored so that they absorb light uniformly or selectively, or their surfaces may be subjected to a conventional non-glare treatment.

In the following discussion, it should be understood that in many instances the embodiments are described with only one transparent support being utilized. However, if desired, more than one, for example, two or more transparent supports can be utilized in every instance, though seldom will more than two transparent supports be used. Generally speaking, however, except for those embodiments wherein two transparent supports are specifically spoken of, it is preferred to utilize only one transparent support.

While in certain preferred embodiments of the present invention varying diffusion layer, intermediate layer and transparent support thicknesses are used, usually, a diffusion layer is from about 0.1 to 2 mm thick, and an intermediate layer is about 1 mm or less thick, preferably about 0.5 mm or less thick, and more preferably 0.1 mm or less thick; except for certain specific uses, i.e., as later described wherein flexible transparent supports are used having a thickness of 0.5 mm or less, more preferably 0.05 to 0.3 mm, there is no special limitation on the transparent support as such will vary greatly depending upon user requirements except, further when a micro-optical structure is provide on the surface of a transparent support the transparent support is generally about 1 mm thick or less, more preferably 0.5 mm or less, and even more preferably 0.1 to 0.3 mm, in order to decrease the distance between the micro-optical structure and the diffusion layer. It can be said, for most commercial interests, any transparent support utilized will be from about 0.1 to about 20 mm, even more commonly 0.05 to 5mm.

Preferred embodiments of the present invention are as follows:

(I) A rear projection screen in which a light diffusion layer comprising a sheet containing wax as a main component is bonded to a transparent support comprising through an intermediate layer comprising a photocurable composition; a highly preferred species of this embodiment comprises a transparent support bonded to a light diffusion layer as described through an intermediate layer as described wherein a micro-optical element structure is formed on the surface of the light diffusion layer, which light diffusion layer comprises wax. In general, this is preferred to a structure wherein a single transparent support is bonded to a light diffusion layer via a photocurable intermediate layer, since the number of interfaces is lowered. Preferred transparent supports in this embodiment are a glass sheet or an acrylic resin sheet.

(II) A rear projection screen in which a light diffusion layer comprising a crystalline polymer is bonded to a transparent support through an intermediate layer comprising a photocurable composition; a highly preferred species of this embodiment comprises a transparent support bonded to a light diffusion layer as described through an intermediate layer as described wherein a micro-optical element structure is formed on the surface of the light diffusion layer, which light diffusion layer comprises a crystalline polymer. In general, this is preferred to a structure wherein a single transparent support is bonded to a light diffusion layer via a photocurable intermediate layer, since the number of interfaces is lowered. Preferred transparent supports in this embodiment are a glass sheet or an acrylic resin sheet.

(III) A rear projection screen in which a light diffusion layer comprising a sheet containing wax as a main component is bonded to a transparent support having a surface micro-optical structure or a transparent support having an LCF structure through an intermediate layer comprising a photocurable composition.

(IV) A rear projection screen in which a light diffusion layer comprising a crystalline polymer is bonded to a transparent support having a micro-optical element structure or a transparent support having an LCF structure through an intermediate layer comprising a photocurable composition.

(V) In one particularly preferred embodiment of the present invention, a rear projection screen is provided which comprises a light diffusion layer and a transparent support, the light diffusion layer and the transparent support being bonded to each other through an intermediate layer comprising a photocurable composition, wherein the rear projection screen is colored until its color temperature conversion capability reaches a color tone having a Mired shift value of about −5 to about −120 and its transmittance, as a whole, reaches about 40 to about 70%. This embodiment of the present invention provides a rear projection screen which has excellent mechanical and optical properties, and, further, has excellent color image reproduction capability.

Recently, with advances in microfilming, it has become necessary to reproduce not only microfilms of documents (monochromatic line drawings), but also continuous gradation microfilm for medical or scientific use and color microfilm. Thus, rear projection screens are now often required to have the ability to faithfully reproduce the images of an original microfilm with respect to pattern, color tone, and contrast.

Irrespective of these requirements, however, the art has not hitherto taken these factors into consideration, and only attempts to improve color image reproduction by coloring the screen as described in U.S. Pat. No. 3,655,262 have been made.

U.S. Pat. No. 3,655,262, however, does not disclose as to how the color tone and transmittance under ordinary room conditions should be controlled, i.e., to make it possible to faithfully and naturally reproduce color images, and also it fails to disclose conditions for desired light diffusion layers.

The surface of the transparent support, which is in contact with the light diffusion layer, may be matted so as to improve the adhesion between the transparent support and the light diffusion layer. The thickness of the transparent support is subject to no specific limitation and can be selected within a suitable range. In general, it is about 0.1 to about 5 mm.

Moreover, it is necessary to bond the light diffusion layer and the transparent support not directly but through an intermediate layer comprising a liquid photocurable composition as earlier described.

When the rear projection screen of this embodiment is used for microreaders to reproduce a color image, the color tone of the color image is observed by the viewer in a subjective manner. In particular, the color tone tends to be affected by the color temperature of the room light where the image is viewed. For example, under light having a high color temperature, the color image projected appears reddish, while under light having a low color temperature, the same color image appears bluish. That is, the color tone of the projected image is determined by a combination of the system (color of the light source/color of the rear projection screen/color of the room light). According to studies by the inventors, it was found that the most excellent color reproducibility can be obtained when the color temperature of the system (light source/rear projection screen) agrees with the color temperature of the room light. The light sources which are used for most microreaders at present are a tungsten or halogen lamp having a color temperature of 2,800 to 3,400 Kelvin, and room light conditions range from tungsten lamp illumination to sunlight illumination, the color temperature thereof being 2,800 to 5,500 Kelvin. Therefore, the rear projection screen itself is required to have a color temperature which corrects the difference between the above color temperatures depending upon the conditions of use of the microreader. Such color temperature converting capability of the rear projection screen is appropriately expressed by the Mired shift value. Here, the Mired shift value expresses a color temperature converting capability, meaning how Mired values defined by the following formula are shifted.

$$\text{Mired Value} = \frac{1,000,000}{\text{Color Temperature (Kelvin)}}$$

where the "Color Temperature" is that of the screen when a light is projected onto the screen.

A positive Mired shift value shows the capability of lowering the color temperature of the light source, and such rear projection screen usually has an amber color tone, while a negative Mired shift value shows the capability of increasing the color temperature of the light source, and such rear projection screen usually has a blue color tone.

The color temperature converting capability of a rear projection screen which can convert a color temperature of 2,800 to 3,400 Kelvin to 2,800 to 5,500 Kelvin is 0 to −175 expressed as a Mired shift value. However, according to further experiments by the inventors, it was established that a rear projection screen having a color tone such that the Mired shift value is in the range of about −5 to about −120 reproduces extremely preferred color images under various room light conditions encountered in the practical use of microreaders.

Such a rear projection screen having a Mired shift value of about −5 to about −120 can be obtained by coloring the diffusion layer, be it a crystalline polymer or wax diffusion layer and/or the transparent support. To improve the ratio of light from the light source to the room light (the S/N ratio), the coloring of the transparent support is preferred.

When color image reproducing capability is taken into consideration, the contrast of the rear projection screen is also important. In order to improve the contrast, various methods can be used. The most effective is to lower the reflectance of the rear projection screen so as to prevent room light from being reflected from the rear projection screen and then striking the viewer's eyes. In this point, a crystalline polymer type diffusion layer has the lowest diffuse reflectance next to the wax type light diffusion layer, and, therefore, both are quite advantageous also from the viewpoint of the contrast. On the contrary, when other light diffusion layers are used, the reflection of room light from the rear projection screen is increased since their diffuse reflectance is higher than that of a wax or crystalline polymer light diffusion, and therefore, there are some problems in improving the contrast of such rear projection screens.

However, even the use of a wax or crystalline polymer as a light diffusion layer and the coloring of the rear projection screen to the aforesaid color tone, as described above, are insufficient to naturally reproduce color images, although making possible the reproduction of a color image having excellent color balance. In particular, the density of black colors in shadow areas is unsatisfactory, and it is preferred to further improve the contrast.

In order to meet such a requirement, the rear projection screen is, desirably, colored black to a neutral tint having a uniform spectral absorption to lower the transmittance (in the context of the present invention, "spectrally uniformly blackening" or equivalent terminology implies that the blackening effect is constant without depending on the wavelength of the radiation involved).

For this purpose, the manner of blackening the light diffusion layer and the manner of blackening the transparent support can be the same, keeping in mind that one can blacken the diffusion layer or blacken the transparent support or blacken both the diffusion layer and the transparent support. Blackening of the transparent support is more advantageous from the viewpoint of ease of coloring and a more effective use of the effect of the blackening. In the case of blackening the transparent support, room light which enters the rear projection screen and is reflected in the inside of the light diffusion layer or in the inside of the microreader to return toward the viewing side undergoes absorption by the blackened transparent support twice, once on entering and once on being reflected. On the other hand, light from the light source which projects the image only undergoes absorption once by the blackened transparent support. Therefore, the ratio of the light from the light source to room light which strikes the viewer's eyes (i.e., the S/N ratio) is greatly improved, giving a color image having increased contrast and a higher black density in shadow areas. Contrary to this, in the case of blackening the light diffusion layer, room light which is reflected near the surface on the viewer side of the diffusion layer does not undergo two absorptions by the blackened part of the rear projection screen, making it difficult to obtain a satisfactory improvement of the S/N ratio.

As the blackening gives a deeper black, the contrast is more improved. However, the absorption of light from the light source can be greatly increased, and, thus, the projected image itself is also darkened. Therefore, blackening has its limits. According to experiments by the inventors, it has been found that the most practical and desirable results can be obtained when a rear projection screen is colored so as to have a desired color temperature converting capability as described above has incorporated therein a dye or the like to blacken the same to a neutral tint so as to further absorb light in a spectrally uniform manner, the coloring providing a luminous transmittance with CIE standard illuminant C ranging from about 40 to about 70%, preferably 45 to 65%.

The blackening, of course, does not exert any influence on the color temperature converting capability of the rear projection screen.

Coloring so as to confer color temperature converting capability upon the rear projection screen and to increase the contrast are preferably performed on the transparent support on the viewer side but can, in theory, also be performed on the diffusion layer or the transparent support having the V-groove lenticular lens structure. However, in order to increase the contrast of the rear projection screen, coloring of the transparent support on the viewer side is advantageous.

It should be noted that the improvement of the contrast which results from the blackening is further promoted by using a wax or crystalline polymer light diffusion layer as a light diffusion layer. This is because a wax or crystalline polymer light diffusion layer is excellent in transmittance (the wax light diffusion layer being superior), and, therefore, when the transparent support is blackened, the amount of light transmitted by the rear projection screen is not so reduced and the image is not darkened beyond the degree required. Moreover, since the diffuse reflectance of the crystalline polymer type diffusion layer is the next lowest to the wax type diffusion layer, the amount of reflected room light is small, and, as a combined effect of both properties, the S/N ratio is increased. When other light diffusion layers are used, which have a lower transmittance than the wax or crystalline polymer light diffusion layer, the blackening reduces the amount of light traversing the rear projection screen and markedly darkens the image, making faithful color image reproduction very difficult. Moreover, other light diffusion layers have a higher diffuse reflectance than a wax or crystalline polymer light diffusion layer, as described above, and so, as the combined effect of both properties, the S/N ratio is remarkably increased as compared with the case of using a wax or crystalline polymer diffusion layer. Therefore, it is difficult to obtain a rear projection screen which meets the objects of this embodiment of the invention using other light diffusion layers.

In addition, in order to faithfully reproduce a color image, it is also required that scintillation not be observed on the rear projection screen. Scintillation impairs the texture of the color images, and, in particular, flesh and flower textures are hard to faithfully reproduce. In this point a wax or crystalline polymer diffusion layer provides only very low scintillation and enables faithful reproduction of the texture of such color images.

The surface on the viewer side of the transparent support having a color temperature converting capability may be subjected to non-glare treatment, e.g., to provide a surface similar to that in frosted glass, to prevent the specular reflection of room light, or the surface which is in contact with the wax or polymer diffusion layer may be matted to improve adhesion, which also provides a surface similar to a frosted glass surface.

In this invention, the wax or crystalline polymer diffusion layer and the transparent support are bonded through an intermediate layer comprising a photocurable composition, as earlier described.

In those instances in the earlier discussion wherein coloring is called for in any element, conventional coloring agents are used, for example, Toluidine Blue, Brilliant Acid Blue, Cyanine Blue, First Light Red, Super Chrome Yellow, Ethyl Orange and other dyes; titanium oxide, carbon black, cadmium red, barium yellow, cobalt green, manganese violet and other inorganic pigments; Vulcan Orange, Lake Red and other azo pigments; nitroso pigments; nitro pigments; basic dye Lakes; acidic dye Lakes; phthalocyanine pigments; fluorescent pigments, etc.

The coloring agents used are not, of course, limited to the above. Coloring agents can be added to the elements using conventional processing techniques, for example, with an acrylic plate the coloring agent can be mixed in a monomer and thereafter polymerization conducted. Obviously, other techniques of coloring can be used. Transparent supports, for example, having the desired optical transparency are commercially available and again, if desired, one can "custom order" from a manufacturer.

(VI) In a further highly preferred embodiment of the present invention, a rear projection screen is provided which is substantially identical to that described in (V) above, except that a micro-optical element structure is provided on the surface of the rear projection screen which is to face the light source. The light diffusion layer of these rear projection screens is a wax and/or crystalline polymer, and the rear projection screens of this particular embodiment have very excellent light redistribution capability and excellent image reproduction capability.

The micro-optical element structure utilized in this embodiment of the present invention is the same as that described in U.S. patent application Ser. No. 654,830 filed Feb. 3, 1976 and entitled Rear Projection Screens, which corresponds to Japanese Patent Application 14,541/1975. With the micro-optical element structure, it is, in general, possible to change the light redistribution capability at will by suitably selecting the form of the micro-optical element used. The size of each component of the micro-optical element structure is also described in U.S. patent application Ser. No. 654,830, supra, which corresponds to Japanese Patent Application 14,541/1975, and such micro-optical element structures can be formed as disclosed therein without modification for use in the present invention.

The surface of the transparent support in contact with the wax diffusion layer may be matted like frosted glass so as to strengthen the adhesion between the transparent support and the light diffusion layer. The thickness of a transparent support with the micro-optical element structure is required to be not more than about 1 mm, preferably not more than 0.5 mm, and more preferably 0.1 to 0.3 mm. If the thickness is more than about 1 mm, the image at the periphery of the rear projection screen becomes a double image distinguishable to the naked eye.

As a transparent support with the color temperature conversion ability there can be used the same materials which are used to form the transparent support provided with the micro-optical element. The thickness of this transparent support is selected within any desired range which is not limited, and it is usually about 0.1 to about 5 mm.

As earlier indicated under the discussion regarding embodiment (V), where a color image is reproduced on a rear projection screen, the color tone of the color image to be observed is subjective, that is, it varies depending on the viewer, and the color tone is liable to be influenced by, in particular, the color temperature of the exterior light surrounding the position where the image is observed. Accordingly, in this particular embodiment of the present invention the earlier discussion regarding embodiment (V) comprising Mired values and transmittance supplies with equal force, i.e., the rear projection screens of this embodiment which comprise a micro-optical element structure have a color tone having a mired shift value of about −5 to about −120 and are blackened so as to have a light transmittance under illuminant C of about 40 to about 70%, more preferably 45 to 65%, as earlier described in detail. As will be appreciated by one skilled in the art, the rear projection screen of this embodiment provides all of the benefits of embodiment (V) described above plus, further, the rear projection screen of this embodiment provides greater flexibility due to the micro-optical element structure provided thereon.

In addition, however, the use of a micro-optical element structure of this embodiment provides further benefits. For example, as earlier discussed, where the wax or crystalline polymer light diffusion layer is blackened, external light reflected at areas near the surface of the light diffusion layer facing the viewer are not subjected to double absorption at the blackened protion of the rear projection screen, and thus it is difficult to improve the S/N ratio.

In a similar fashion, where the transparent support is provided with a micro-optical element structure and is colored, since external light is primarily reflected in the light diffusion layer, it is somewhat difficult to improve the S/N ratio and it is extremely difficult to improve the contrast.

These defects can be removed by placing the transparent support with the micro-optical element structure at the side of the viewer (it goes without saying that the micro-optical element structure is provided on the surface facing the viewer). With such a construction, however, the micro-optical element structure is at the surface facing the viewer, which is not very desirable since the micro-optical element structure is liable to be damaged and there is the fear of its optical properties changing with the passage of time.

It should be noted that the contrast due to such blackening is only most effectively increased when a wax or crystalline polymer light diffusion layer is used as the light diffusion layer. The reason for this is that since the wax or crystalline polymer light diffusion layer is markedly high in transmittance as compared with other light diffusion layers, even though the transparent support is blackened the amount of the light passing through the rear projcetion screen is not decreased very much and the image does not become darker than necessary, and furthermore, since it is quite low in diffusion reflectance as compared with other light diffusion layers, the reflection amount of exterior light is small, as a result of which it is possible to make the best use of the effect due to the blackening, thereby sufficiently increasing the S/N ratio.

In a manner similar to that as discussed for embodiment (V), the rear projection screens of the instant embodiment which comprise a crystalline polymer or wax light diffusion layer show markedly low scintillation, and in a similar fashion, may be subjected to a non-glare treatment as earlier described.

Of course, the wax or crystalline polymer diffusion layer is bonded to the transparent support not directly but through an inermediate layer comprising photocurable composition as earlier described.

Figure 7:
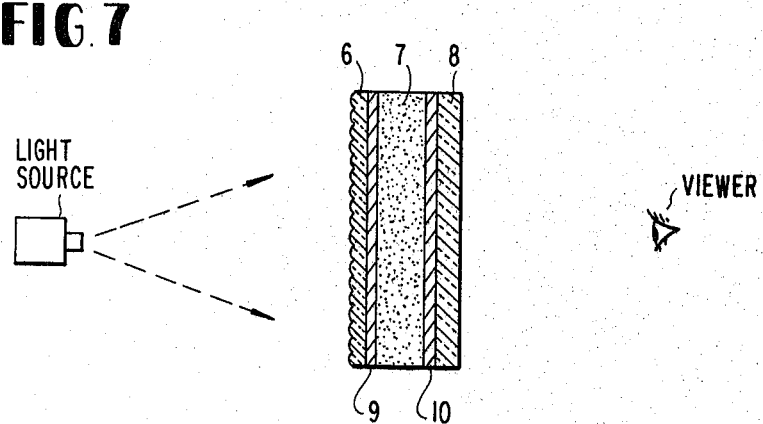
FIG. 7 is a schematic representation of yet another rear projection screen in accordance with the present invention.

FIG. 7 shows an embodiment of the rear projection screen to the present invention, wherein 6 is a transparent support with the micro-optical element structure provided on the surface thereof, and the surface with the micro-optical element structure provided thereon is turned toward the projection light source so that it is prevented from being damaged (the left side in FIG. 7); 7 is a wax and/or crystalline polymer diffusion layer; 8 is the transparent support of a color tone having a Mired shift value of about −5 to about −120, which is blackened until the transmittance, as a whole, reaches about 40 to about 70%; and the transparent supports 6 and 8 are bonded to the wax diffusion layer through the intermediate layers 9 and 10 comprising a photocurable composition, about a 0.1 to 2 mm diffusion layer gives good results.

In a particularly preferred aspect of this embodiment, transparent support 8 as shown in FIG. 7 is deleted (as, of course, is the intermediate layer 10), and the rear projection screen thus comprises only a transparent support 6, an intermediate layer and a light diffusion layer which has a micro-optical structure on the surface thereof. This reduces the number of interfaces in the rear projection screen.

For a wax or crystalline polymer light diffusion layer of this embodiment, a most suitable thickness is about 0.1 to about 10 mm, preferably 0.1 to 2 mm, which is sufficiently thicker than those of other diffusion layers. Therefore, when a micro-optical lens structure is directly provided on the surface of the wax or crystalline polymer light diffusion layer, the optical properties are not impaired.

In accordance with the present invention, as described above, a rear projection screen which has excellent mechanical strength, which can be varied in light redistribution capability with ease, and which as excellent color image reproduction ability can be obtained without losing the excellent opticalproperties of a wax or crystalline polymer light diffusion layer.

(VII) In a further highly preferred embodiment of the present invention, a rear projection screen is provided which comprises a light diffusion layer, the surface on the light source side of which has a V-groove lenticular lens structure with about a 0.03 to about a 1 mm pitch and about a 90° to about a 150° top angle, most preferably a top angle of 100° to 130°, and a transparent support which is colored so as to have a color tone with a Mired shift value as in embodiment (V) and exhibits, as a whole, about a 40 to about a 70% luminous transmittance with illuminant C as in embodiment (V) above.

This particular embodiment of the present invention, of course, involves a rear projection screen of excellent optical and mechanical proeprties which is especially useful for simultaneous viewing by a plurality of viewers, providing excellent color image reproduction capability.

For this embodiment, of course, the earlier disclosure concerning embodiment (V) regarding coloring, Mired values, etc., applies with equal force since this embodiment is essentially a species of embodiment (V), and such will not be repeated at this point of the specification other than to note that for this embodiment of the present invention the transparent supports are identical to those set forth for embodiment (V), that the thickness of the transparent support utilized in this embodiment of the present invention is not particularly limited, but can be varied within ranges generally used in the art, typically, on the order of about 0.1 to about 5 mm. However, the thickness of the transparent support with the micro-optical element structure is required to be not more than about 1 mm, preferably not more than 0.5 mm, and more preferably 0.1 to 0.3 mm. If the thickness is more than about 1 mm, the image at the periphery of the rear projection screen becomes a double image distinguishable to the naked eye.

As was earlier being described, the present invention provides rear projection screens which are superior in general to those of the prior art.

However, with some of the embodiments of the present invention earlier described the light redistribution capability is limited by the diffusion capability of the light diffusion layer, and, therefore, it is difficult to properly control the the light redistribution capability. The light redistribution capability of a rear projection screen is, in general, not necessarily three dimensionally isotropic, rather, it is desirable in many cases to redistribute the light only in a certain limited area, particularly from the viewpoint of efficiently using the light transmitted by the light diffusion layer. In particular, where a plurality of viewers are going to simultaneously observe a projected image, in this case the image must be one such that can be observed by any of the viewers with clarity and equal brightness. For such purposes, diffusion capability in the horizontal direction is required to be higher than that in the vertical direction.

However, rear projection screens which comprise a light diffusion layer, be it a wax light diffusion layer or a crystalline polymer light diffusion layer, bonded to a transparent support through an intermediate layer without any other modification are able to meet the above demands of plural viewers only with great difficulty since the light redistribution capability thereof is limited by the diffusion capability of the light diffusion layer.

Moreover, for preferred rear projection screens it is especially required to be able to accurately reproduce an original microfilm image, i.e., pattern, color tone and contrast. However, the art has, in general, not given much attention to these three factors, for example, in the prior art, color tone was selected only to match the color tone of the room and not to cause eye fatigue, i.e., little attention was given to the selection of a color tone to permit the faithful reproduction of color images.

The thickness of the diffusion layer, be it a wax or crystalline polymer diffusion layer used in this embodiment of the invention, is not particularly restricted so long as the resolving power of the rear projection screen is not reduced. In addition, the desired resolving power of the rear projection screen depends upon the distance between the viewer and the surface to be observed, and, therefore, the thickness cannot be unequivocally set. However, considering the usual applications of rear projection screens, an adequate thickness is generally on the order of about 0.1 to about 2 mm, preferably from 0.1 to 1 mm, for this embodiment where a "sandwich" structure is used, i.e., where two transparent supports are used. However, for a wax or crystalline polymer light diffusion layer of this embodiment where only one transparent support is used and a V-grooved lenticular lens structure is directly formed on the wax or crystalline polymer light diffusion layer, a most suitable thickness is about 0.1 to about 10 mm, preferably 0.1 to 2 mm, which is sufficiently thicker than those of other diffusion layers, and, when the V-grooved lenticular lens structure is directly provided on the surface of the wax or crystalline polymer light diffusion layer, the optical properties are not impaired. As earlier indicated, this embodiment is preferred because the number of interfaces are lowered. This general thickness range, of course, applies wherever a V-grooved lenticular lens structure is directly provided on a wax or crystalline polymer light diffusion layer.

It is disclosed in Japanese Patent Application No. 14,541/75 by the inventors that the light redistribution capability of a rear projection screen can be improved by providing a micro-optical element structure on the surface of the rear projection screen.

As earlier indicated, when plural viewers observe a projected image together, it is required that the image observed by each viewer be uniform in brightness and be clear. In order to satisfy such requirements, it is desired to increase the diffusing capability in the horizontal direction so that the light redistribution capability curve can be of a trapezoidal form, i.e., it is desired that the rear projection screen shows a light redistribution capability curve such that the relative luminance is uniform over a wide range of the central area and it rapidly lowers at the outside of a certain area. To meet such a demand, the inventors have performed various research, and, as a result, found that this purpose can be achieved by providing a V-grooved lenticular lens structure.

Figure 9:
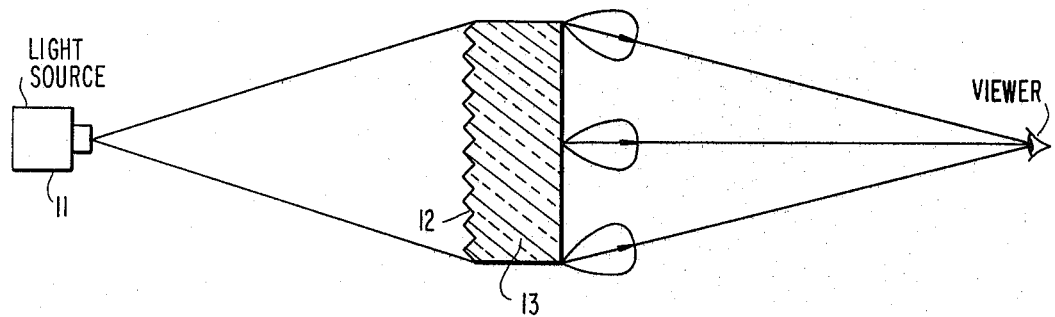
FIG. 9 is a view showing the light path using a light diffusion layer having a V-groove lenticular lens structure as described in the specification.
Figure 10:
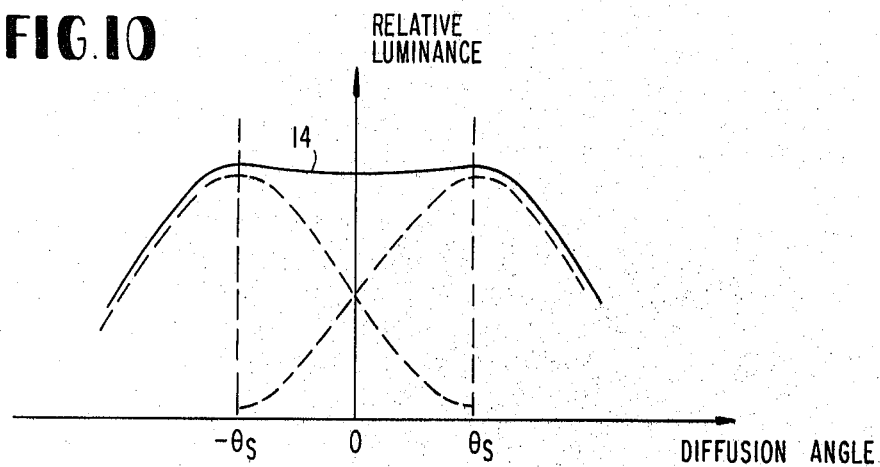
FIG. 10 is a view showing the light-redistribution characteristic curve in the case of using a light diffusion layer having a V-groove lenticular lens structure as described in the specification.

The V-grooved lenticular lens structure has a V-shaped cross section as shown in FIG. 9, as described in detail in U.S. patent application Ser. No. 654,830 filed Feb. 3, 1976, which corresponds to Japanese Patent Application No. 14,541/75. In FIG. 9, rays from a projection optical system 11 are first refracted at V-grooved lenticular lens structure 12 and separated into two directions. Each ray is diffused in its passage through the light diffusion layer 13. Therefore, the rays which have traversed the light diffusion layer 13 become diffused light that has a wider diffusion width in the direction into which the rays have been separated as compared with light which has traversed the light diffusion layer alone. As described above, the V-grooved lenticular lens structure 12 has two surfaces which are exposed at different angles to the light from the projection optical system 11, and the rays are refracted in opposite directions, depending upon which surface of the V-grooved lenticular lens structure 12 the ray impinges on. Therefore, the same effect as in the case of shining light onto a flat rear projection screen using two light sources is obtained. Consequently, the light which has traversed the rear projection sheet shows a light redistribution capability curve 14 of trapezoidal form as shown in FIG. 10. The light redistribution capability curve 14 is such that two distributions which respectively correspond to the light redistribution capability curve of the light diffusion layer itself, which is shifted by $+\theta s°$ or $-\theta s°$ from a diffusion angle of $0°$, are summed. In this connection, in order to attain the aforesaid purpose, it is required to make the top of the light redistribution capability curve 14 nearly flat and to make the entire form trapezoidal. To satisfy such conditions, it is preferred that the shift angle $\theta s$ be near or close to the diffusion angle of $\theta\frac{1}{2}$ (hereinafter referred to as the "half-value width") at which the relative luminance on the light redistribution capability curve of the light diffusion layer itself is reduced to $\frac{1}{2}$ of that at a diffusion angle of $0°$. If $\theta s$ is excessively larger than $\theta\frac{1}{2}$, the light redistribution capability curve indicates two distinct peaks. The use of such a light diffusion layer is undesirable because two "hot spots" appear. On the other hand, if $\theta s$ is extremely smaller than $\theta\frac{1}{2}$, the peak of the light redistribution capability curve is no longer flat, and the effect of the V-grooved lenticular lens structure to increase the diffusion capability is reduced.

Diffusion capability is an absolute parameter, which differs somewhat from light redistribution capability in that the former can be discussed without reference to any particular use, whereas the latter must be related to some type of use. For example, with a screen having a very high diffusion capability it can be predicted that light redistribution capability will be high with a plurality of viewers. However, when only one viewer is involved, it can be predicted that a screen having a very high diffusion capability will have a low (or poor, for the use involved) light redistribution capability.

As described above, $\theta s$ is desirably chosen so as to be near or close to the half-value width $\theta_{\frac{1}{2}}$ of the light redistribution capability curve of the light diffusion layer. This can be accomplished by adjusting the dimensions of the vertical angle of the V-grooved lenticular lens structure. However, since $\theta s$ also depends upon the refractive index of the material of the light diffusion layer and since $\theta_{\frac{1}{2}}$ depends on the specific conditions of the light diffusion layer, it is impossible to unequivocally set the demensions of the top angle of the V-grooved lenticular lens structure.

In general, the half-value width $\theta_{\frac{1}{2}}$ of a wax or crystalline polymer light diffusion layer having excellent optical characteristics is about 10° to about 25°, preferably 14° to 21°, and its refractive index is in the range of about 1.45 to about 1.55. From these, it is evident that the preferred top angle of the V-grooved lenticular lens structure is about 90° to about 150°, desirably 100° to 130°.

Moreover, it is required that the pitch of the V-grooved lenticular lens structure be about 0.03 mm to about 1 mm, preferably 0.05 to 0.3 mm. If the pitch is less than about 0.03 mm, diffraction occurs, and difficulties arise in the production thereof. If the pitch is more than about 1 mm, the viewers can generally distinguish the grooved structure, although this depends upon the distance between the viewer and the surface of the rear projection screen, and, therefore, viewing is obstructed, and, furthermore, the quality of the projected image is lowered, e.g., the resolving power is lowered.

The aforesaid V-grooved lenticular lens structure is, desirably, directly provided on the surface of the wax or crystalline polymer type diffusion layer. This is because if the V-grooved lenticular lens structure is provided on the surface of the transparent support, the light diffusion surface of the light diffusion layer is positioned away from the light diffusion surface of the V-grooved lenticular lens structure, and, therefore, the image becomes a double image or is not focussed. To directly provide the V-grooved lenticular lens structure on the surface of the light diffusion layer, the thickness of the light diffusion layer must be sufficiently thick. If this is not so, the thickness of the light diffusion layer is relatively largely changed by the provision of the V-grooved lenticular lens structure, thus changing the diffusing capability of the light diffusion layer.

The method of directly providing the V-grooved lenticular lens structure on the surface of the diffusion layer, be it a wax or crystalline polymer diffusion layer, is quite the same as that disclosed in U.S. patent application Ser. No. 654,830 filed on Feb. 3, 1976, which is equivalent to Japanese Patent Application No. 14,541/75.

According to this embodiment of the invention, the following novel effects are obtained.

(i) Since a wax or crystalline polymer type diffusion layer which is excellent in optical properties but unsatisfactory in mechanical strength is bonded to a transparent support through the intermediate layer comprising a photocurable composition as earlier described, it becomes possible to obtain a rear projection screen having excellent optical and mechanical properties.

(ii) Since the V-grooved lenticular lens structure can be directly provided on the surface on the light source side of a wax or crystalline polymer light diffusion layer, the transmitted light can be redistributed over a wide range and with uniform brightness while loss of light at the interface is minimized, and, therefore, it becomes possible for plural viewers to simultaneously observe a projected image with uniform brightness.

(iii) Since the transparent support is colored, color images can be faithfully reproduced.

(VIII) In a further highly preferred embodiment of the present invention, a rear projection screen is provided which comprises a light diffusion layer, on the surface of the light source side of which there has been provided a Fresnel lens structure with about a 0.03 mm to about a 1 mm pitch and about a 20 cm to about a 100 cm focal length, and a transparent support which has a color tone and a transmittance as described in the discussion regarding embodiment (V) above, i.e., a color tone such that the Mired shift value is in the range of about $-5$ to about $-120$ and a luminous transmittance with illuminant C, as a whole, of about 40 to about 70%, the light diffusion layer being bonded to the transparent support through an intermediate layer comprising a photocurable composition as earlier described.

This particular embodiment of the present invention is especially well suited for viewing by a single viewer, and provides excellent color image reproduction capability.

As was earlier discussed with respect to the embodiment of the present invention wherein a V-groove lenticular lens structure is utilized, the light redistribution capability of a rear projection screen which merely comprises a light diffusion layer and one or more transparent supports bonded thereto utilizing a photocurable composition is limited by the diffusion capability of the light diffusion layer. While in many instances it is, of course, desirable to have maximum light redistribution in the horizontal direction, for example, where a plurality of viewers are involved, on the other hand, when one viewer observes a projected image on a rear projection screen it is sufficient if the light is redistributed primarily or only to the viewing position of the viewer, and it is not desirable to redistribute light to other areas since the transmitted light is not effectively used. For the situation where only one viewer is involved, a rear projection screen should function to converge transmitted light to the viewing point. However, a rear projection screen comprising only a light diffusion layer and a transparent support or supports which are bonded through an intermediate layer of a photocurable polymer as earlier described meets such demands only with difficulty, as earlier explained.

Also, as earlier explained, for highly preferred rear projection screens it is necessary to obtain accurate reproduction of an original microfilm image, i.e., pattern, color tone and contrast, and the art has paid little attention to these factors.

The thickness of the light diffusion layer, be it a crystalline polymer or wax diffusion layer used in this embodiment of the invention is not particularly restricted so long as the resolving power of the rear projection screen is not reduced. In addition, the desired resolving power of the rear projection screen depends upon the distance between the viewer and the surface to be observed, and, therefore, the thickness cannot be unequivocally set. However, considering the usual applications of rear projection screens, an adequate thickness is generally on the order of about 0.1 to about 10 mm and preferably ranges from 0.1 to 2 mm.

When a single viewer observes a projected image on the rear projection screen, transmitted light which has passed through the rear projection screen need be redistributed only to the viewer from the viewpoint of effectively using the transmitted light. In order to meet such a requirement, the inventors performed various research, and, as a result, found that desirable results can be obtained by providing a Fresnel lens structure having a pitch of about 0.03 to about 1 mm, preferably 0.05 to 0.3 mm, and a focal length of about 20 to about 100 cm, preferably 40 to 80 cm, on the rear projection screen. If the pitch is less than about 0.03 mm, diffraction is liable to occur, and difficulties arise in the preparation thereof. If the pitch is more than about 1 mm, the viewer can generally distinguish the structure of the Fresnel lens, although this depends upon the distance between the viewer and the surface of the rear projection screen, and, therefore, viewing is obstructed, and, furthermore, the quality of the projected image is lowered, e.g., the resolving power is lowered.

Moreover, if the rays from the projection light source which are incident to the rear projection screen are parallel and the viewer does not move, it is sufficient for the focal length to be equal to the minimum distance of distinct vision. However, since the rays from the projection light source which are incident to the rear projection screen are not parallel, and it is actually impossible for a viewer to remain motionless, it is not necessary to choose the focal length so as to be equal to the minimum distance of distinct vision.

The basic requirement from this viewpoint is to select the focal length so that loss of transmitted light is prevented to enable a single viewer to observe a bright, clear image, as well as so that even when the viewer moves, the amount of transmitted light which strikes the viewer's eyes is scarcely changed, and, thus, the viewer always observes a projected image with the same brightness. This requirement cannot be satisfied by selecting the focal length so as to be equal to the minimum distance of distinct vision. It is considered that such requirement is fulfilled by a focal length for the Fresnel lens structure ranging from such a focal length that the transmitted light is focussed at the minimum distance of distinct vision away from the rear projection screen to such a focal length that the transmitted rays emerging from the rear projection screen become parallel. Since such as focal length depends upon the distance between the projection light source and the rear projection screen, it is difficult to express such numerically, but the desirable focal length of the Fresnel lens structure is about 20 to about 100 cm, preferably 40 to 80 cm, for use in usual microfilm readers.

The Fresnel lens structure is, desirably, directly provided on the surface of the light diffusion layer, be it a wax or crystalline polymer light diffusion layer. This is because if the Fresnel lens structure is provided on the surface of the transparent support, the light diffusion surface of the light diffusion layer is positioned away from the light diffusion surface of the Fresnel lens structute, and, therefore, the projected image may become a double image or may be not focussed. To directly provide the Fresnel lens structure on the surface of the light diffusion layer, the thickness of the light diffusion layer must be sufficiently thick. If it is not, the thickness of the light diffusion layer is relatively greatly changed by the provision of the Fresnel lens structure, thus changing the diffusion capability of the light diffusion layer. However, for the light diffusion layer, be it a wax or crystalline polymer light diffusion layer of this invention, a most suitable thickness of about 0.1 to about 10 mm, preferably 0.1 to 2 mm, as described above, which is sufficiently thicker than those of other light diffusion layers. Therefore, when a Fresnel lens structure is directly provided on the surface of, e.g., a wax or crystalline polymer light diffusion layer, optical properties are not impaired.

The method of directly providing the Fresnel lens structure on the surface of the wax crystalline polymer type diffusion layer is quite the same as that disclosed in U.S. patent application Ser. No. 654,830 filed Feb. 3, 1976.

The transparent supports which can be used in this embodiment of the invention are not particularly limited and most preferably are the same as those for earlier given.

The thickness of the transparent support(s) is not particularly restricted and can be varied within a common range, a thickness on the order of about 0.1 to about 5 mm is used. In those instance wherein the trasparent support is provided with the Fresnel lens structure, though this embodiment is not preferred, the transparent support generally has a thickness of about 1 mm or less, more preferably 0.5 mm or less and even more preferably 0.1 to 0.3 mm in order to decrease the distance between the micro-optical structure and the diffusion layer.

Since the discussion offered with respect to embodiment (V) above regarding the color tone, Mired values, blackening, scintillation, etc., applies to the present embodiment, which can be viewed as a species of embodiment (V), such will not be set forth in detail at this portion of the present specification, other than to briefly reiterate that when a rear projection screen of this embodiment is used in a microreader to reproduce color image, the color tone of color image is observed by a viewer in a highly subjective fashion, and, in particular, color tone tends to be affected by the color temperature of the surroundings where viewing is taking place.

It is to be specifically noted in accordance with this embodiment of the present invention, that when color image reproducing capability is taken into consideration, the contrast of a rear projection screen is also important. The most effective method of improving contrast is to lower the reflectance of the rear projection screen so as to prevent room light from being reflected from the rear projection screen into the viewers' eyes. At this point, a wax light diffusion layer has the lowest diffused reflectance followed by a crystalline polymer light diffusion layer, and therefore, both are extremely preferred from this viewpoint.

Suffice it to say for purposes of fully describing this embodiment that, as described in embodiment (V), a highly superior rear projection screen is obtained as earlier described by coloring so as to obtain a luminous transmittance with illuminant C ranging from about 40 to about 70%, preferably 45 to 65%, in combination with a transparent support which is colored so as to have a color tone wherein the mired shift value is in the range of about −5 to about −120.

Further, since the light diffusion layer is bonded to a transparent support utilizing a photocurable composition as earlier defined, all of the benefits obtained by the use of such a photocurable composition are fully illustrated in this embodiment of the present invention.

According to this embodiment of the invention, the following novel effects are obtained.

(i) If a wax or crystalline polymer light diffusion layer, which are excellent in optical properties but unsatisfactory in mechanical strength, is bonded to a transparent support through an intermediate layer comprising a photocurable composition as described, it becomes possible to obtain a rear projection screen having excellent optical and mechanical properties.

(ii) Since a Fresnel lens structure can be directly provided on the surface on the light source side of a light diffusion layer, be it wax or crystalline polymer light diffusion layer, the transmitted light can be redistributed only to a certain viewing point while loss of light at the interface is minimized, and, thus, the transmitted light can be effectively used. Therefore, it becomes possible for a single viewer to observe a bright, clear projected image which has uniform brightness over the whole area of the rear projection screen.

(iii) Since the transparent support is colored, color images can be faithfully reproduced.

Since, of course, in this embodiment the transparent supports are bonded to the light diffusion layer, using a photocurable composition as earlier described, all benefits of such a photocurable composition are achieved. At this point, it is perhaps beneficial to summarize the above disclosure regarding embodiments (VI), (VII) and (VIII). In all of these embodiments, it is possible to utilize systems wherein a first transparent support is bonded to a light diffusion layer via an intermediate layer, which light diffusion layer is in turn bonded to a second transparent support via an intermediate layer, which second transparent support carries a micro-optical structure, all intermediate layers being formed of a photocurable composition as earlier described. Further, the rear projection screens can be colored as earlier described in various fashions, coloring involving the transparent support and/or light diffusion layer and/or the intermediate layer, wherein in embodiments (VII) and (VIII) the elements are specifically a V-groove micro-optical element and a Fresnel lens micro-optical element.

However, in all of the above three embodiments a most highly preferred embodiment is one wherein a single transparent support is bonded to a light diffusion layer via a photocurable intermediate layer, and the light diffusion layer has directly formed on the surface thereof a micro-optical structure, wherein the light diffusion layer and/or the transparent support can be colored as discussed above. (IX) As earlier mentioned, in certain embodiments of the present invention a light diffusion layer is sandwiched between transparent supports having a thickness of not more than about 0.5 mm via intermediate layers comprising a photocurable composition as earlier described. In this embodiment of the present invention it is preferred that the thickness of the trasparent supports be 0.05 to 0.3 mm to increase the range of use thereof and simplify the production thereof by providing the rear projection screen flexibility.

As earlier indicated, the rear projection screens of the present invention are superior to the rear projection screens of the prior art.

However, even when the bonding method of the present invention is utilized, i.e., an intermediate layer comprising a photocurable composition is used, certain disadvantages take place that the high thickness and hardness of the transparent support limits the uses of the member as a rear projection screen, and the production thereof is somewhat difficult despite the fact that the use of an intermediate layer comprising a photocurable composition as described does permit the stress produced at the interface between a light diffusion layer to be reduced.

If the transparent support is flexible, it is possible to correct the aberration of the lens by the rear projection screen because the rear projection screen can be used with ease in the form of curve and it is possible to use as the rear projection screen capable of being observed as a psychological stereoscope by projecting the image on the curved surface. Moreover, it is possible to use the same in novel display screens for advertising. However, if the transparent support is not flexible, i.e., transparent supports having high stiffness are used, the above effect cannot be obtained.

Furthermore, if the thickness of a transparent support is large and the transparent support is hard, it is quite difficult to cut it with convenient means such as a pair of scissors, a knife, a paper cutter, etc., and problems take place in that many difficulties are encountered in producing a rear projection screen.

The material for the transparent support is required to be selected form the above described polymers in such a manner that the difference in the refractive index between the transparent support and the diffusion layer, most preferably a polymer or wax diffusion layer, is minimized.

The diffusion layer and the transparent supports are bonded to each other through intermediate layers comprising a photocurable composition as described. The provision of such an intermediate layer reduces the stress at the interface and prevents the rear projection screen from being broken by differences in coefficients of thermal expansion.

In the case that such a thin film like, flexible and transparent support is used, it should be provided on both sides of the polymer diffusion layer. This is because slight stress is inevitably caused between the polymer diffusion layer and the transparent support since it is impossible to completely remove stress, though stress can be reduced by means of the intermediate layer, and, thus, if the flexible transparent support of the present invention is bonded to only one side of the polymer diffusion layer, the rear projection screen will be bent in a manner similar to a bimetallic strip even by slight force and can be used only with difficulty. Therefore, it is required that both transparent supports have almost equal coefficients of thermal expansion.

The use of such thin, flexible transparent supports enables one to use the transparent supports and the diffusion layer, in the form of long roll in producing the rear projection screen therefrom to thereby continuously bond them, which is different from methods in which a hard plate is used, and to produce the rear projection screen quite conveniently and economically.

Figure 11:
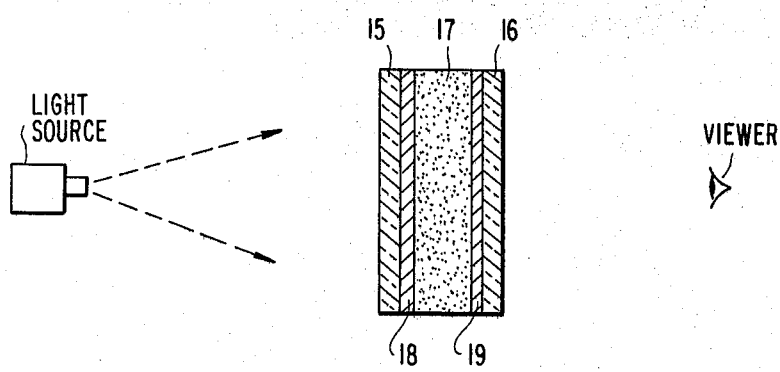
FIG. 11 is a cross sectional view of another embodiment of a rear projection screen in accordance with the present invention, in this particular instance, a rear projection screen wherein the transparent supports are less than about 0.5 mm thick.

FIG. 11 illustrates embodiment of the present invention. In FIG. 11, 15 and 16 are transparent supports having a thickness of not more than 0.5 mm; 17 is a light diffusion layer; and 18 and 19 are intermediate layers comprising a photocurable composition, as earlier described, by means of which the transparent supports 15 and 16 are bonded to the light diffusion layer 17.

In particular, where a wax reforming agent is used in combination with a wax diffusion layer, such can also be used in the form of long roll, and thus the rear projection screen can be produced continuously and quite economically.

This embodiment of the present invention is illustrated in greater detail in later Examples illustrating the use of a crystalline polymer light diffusion layer and a wax light diffusion layer.

In accordance with the present embodiment, the following novel effects can be obtained.

(i) Since a transparent support can improve the optical properties and the mechanical properties of a light diffusion layer itself, a rear projection screen can be obtained which is satisfactory in both optical and mechanical properties.

(ii) In particular, where a light diffusion layer comprising a wax or crystalline polymer is used, a rear projection screen can be obtained which has increased machanical properties without deteriorating the excellent optical properties of the light diffusion layer and, at the same time, which has more excellent optical properties.

Having thus generally described the invention and illustrated several embodiments thereof, the following Examples illustrating in greater detail especially preferred embodiment of the present invention.

In the following Examples, all parts are weight parts and all percentages are weight percentages, unless otherwise indicated.

EXAMPLE 1

To 100 parts by weight of paraffin wax (m.p.=155° F) which had been previously melted at 140° C,5 parts by weight of an ethylene-vinyl acetate copolymer (vinyl acetate content 28%, Evaflex #210 produced by Mitsui Poly Chemical Co., Ltd.) was added while sufficiently mixing. The mixture obtained was poured into the clearance between two glass plates held at an interval of 0.4 mm, solidified by cooling at a cooling rate of 20 deg/min to room temperature and the resulting sheet taken out from the glass plates, whereby a light diffusion layer was obtained. A rear projection screen consisting of the above light diffusion layer alone was designated Rear Projection Screen A.

| Evaflex #210 has the following properties: | |
|---|---|
| melt index | 150 (ASTMD 1238 revised) |
| density | 0.95 |
| refractive index | 1.485 |
| hardness | 65 degrees (JISK 6301) |
| Vicat Softening Point | 40° C or less |

On to a 1.5 mm thick transparent glass plate as a transparent support there was placed as a liquid photocurable composition for forming an intermediate layer a light sensitive resin prepared by sensitizing the composition described in Example 12 of Japanese Patent Application (OPI) 27303/1974 with 1 wt % of dibenzoyl in the form of bead. A part of the light diffuion layer was carefully contacted with the bead-like light-sensitive resin and the contact area was gradually broadened while pressing with the fingers. Lastly excess light sensitive resin was squeezed out with a pair of rollers. The light diffusion layer was uniformly exposed to light with a 4 KW point light source high pressure mercury lamp (Jet Light 2300 produced by OKU SEISAKU-SHO) at a distance of 100 cm for 1 minute to thereby cure the intermediate layer. Thus, a rear projection screen was obtained which was designated Rear Projection Screen B. The thickness of the photocurable composition layer formed was 50 μ; the same thickness was used in all of the following examples, unless othewise indicated.

In this example, and in all following examples unless otherwise indicated, any diffusion layer formed was 0.4 mm thick.

Rear Projection Screens A and B were compared in optical properties; the results obtained are shown in Table 1.

Table 1.

| | Rear Projection Screen A | Rear Projection Screen B |
|---|---|---|
| Scintillation | none | none |
| Image Reproduction Range | 2.5 | 2.5 |
| $\theta_{\frac{1}{2}}$ | 20° | 20° |
| Resolving Power (lines/mm) | not less than 10 | not less than 10 |

From Table 1, it can be understood that Rear Projection Screen B is equal in optical properties to Rear Projection Screen A consisting of the light diffusion layer alone.

With Rear Projection Screen B, no peeling occurred with the passage of time.

COMPARISON EXAMPLE 1

Using a composition prepared by mixing a bisphenol A type epoxy resin adhesive (Araldite AW 106 produced by Ciba Co.) and a curing agent, diethylenetriamine, in a proportion of 1:1 (by weight), a rear projection screen was produced form the same light diffusion layer and transparent support as used in Example 1 in the same manner as in Example 1.

In the intermediate layer of the rear projection screen so obtained, countless minute bubbles were detected, and irregularity in the thickness of the intermediate layer could clearly be detected by the naked eye. Thus, it was impossible to use the rear projection screen obtained above as a rear projection screen.

COMPARISON EXAMPLE 2

Using a composition prepared by mixing the same adhesive agent and curing agent as were used in Comparison Example 1 and ethyl acetate in a proportion of 1:1:1 (by weight), a rear projection screen was produced in the same manner as in Comparison Example 1. In this case, since the viscosity was low, no minute bubbles were formed at mixing, and an intermediate layer having a uniform thickness could be obtained. However, since the evaporation of ethyl acetate was prevented by the light diffusion layer and the transparent support, the intermediate layer failed to cure, and thus no rear projection screen was obtained.

COMPARISON EXAMPLE 3

In Comparison Example 2, after the adhesive agent, curing agent and ethyl acetate were mixed, ethyl acetate was evaporated, and thereafter the light diffusion layer and the transparent support were bonded.

In this case, since the viscosity was low, no incorporation of minute air bubbles due to the mixing of the resin and curing agent as detected in Comparison Example 1 was observed. However, since the viscosity increased due to the evaporation of ethyl acetate, air bubbles were incorporated at bonding, and air bubbles bigger than in Comparison Example 1 were detected in the intermediate layer. Moreover, irregularity in the thickness of the intermediate layer was visible to the naked eye.

EXAMPLE 2

Into 100 parts by weight of a synthetic wax (oligoethylene wax having a melt index of $4 \times 10^3$) which had previously been melted at 160° C was dissolved 10 parts by weight of an ethylene-vinyl acetate copolymer (vinyl acetate content 28%, Evaflex #210 produced by Mitsui Poly Chemical Co., Ltd.) by uniform mixing. The resulting solution was spread onto a stainless steel plate with polytetrafluoroethylene coated thereon (having a surface temperature of 100° C) at a thickness of 0.75 mm, solidified by cooling the stainless steel plate at a cooling rate of 20 deg/min, and then taken off the stainless steel plate, whereby a light diffusion layer 0.75 mm thick was obtained. A 2 mm thick acrylic resin plate whose surface facing the viewer was subjected to a non-glare treatment (matting) and colored grey until the transmittance reached 40% was used as transparent support.

At an edge portion of this transparent support was placed a liquid photocurable composition having the composition as shown in Table 2 in the form of bead, which was then brought in contact with an edge portion of the light diffusion layer. This edge portion was placed between a pair of rollers, and the photocurable composition was filled between the two plates by rolling the rollers. Then, the photocurable composition spread between the two plates was exposed to light with a rod like high pressure mercury lamp for photopolymerization having a length of 51 cm and an output of 20 W/cm (H-1000 TG, produced by Matsushita Electric Industrial Co., Ltd.) at a distance of 50 cm for 10 seconds to thereby cure the intermediate layer. The same exposure conditions were used in the following examples, unless otherwise indicated.

To increase the adhesiveness of the light diffusion layer, the sheet was previously dipped in a mixed solution of dichromic acid (the liquid was at ordinary room temperature $K_2Cr_2O_7$ 75 weight parts, $H_2SO_4$ conc.(d = 1.84) 1500 parts, distilled water 120 parts) for 1 hour.

Table 2

| Ingredients | Amount (parts by weight) |
| --- | --- |
| Tetraethyleneglycol Diacrylate | 20 |
| Trimethylolpropane Triacrylate | 10 |
| 2-Hydroxyethyl Acrylate | 50 |
| Cellulose Acetate Succinate (degree of acetyl substitution 1.9, (degree of succinyl substitution 0.7 molecular weight about 35,000) | 20 |
| Benzoin Methyl Ether | 0.1 |
| Monomethyl Hydroquinone | 0.05 |

The thus obtained rear projection screen exhibited excellent optical properties as in the case of the light diffusion layer alone, and no decrease in resolving power due to adhesion was observed. Moreover, even though the rear projection screen was bent or allowed to stand outdoors for 1 month, no peeling was observed.

EXAMPLE 3

Using a composition as shown in Table 3 as a photocurable composition for the intermediate layer, a rear projection screen was produced in the same manner as in Example 2. The rear projection screen obtained exhibited similar optical and mechanical properties to those in Example 2.

Table 3

| Ingredients | Amount (parts by weight) |
| --- | --- |
| 3-Phenoxy-2-hydroxypropyl Acrylate | 95 |
| Polyethyleneglycol Diacrylate (number of ethyleneglycol units is 20) | 5 |
| Benzoin | 0.5 |

EXAMPLE 4

Examples 4 and 5 illustrate the embodiment of the present invention wherein a rear projection screen is formed which illustrates a certain Mired value and a certain transmittance.

100 parts of a microcrystalline wax having a melting point of 95° C was melted at a temperature of 140° C, to which 10 parts of an ethylene-vinyl acetate copolymer was gradually added while insuring it was dissolved in the microcrystalline wax and completely mixed therein to improve the mechanical properties and the adhesion properties of the microcrystalline wax. The ethylene-vinyl acetate copolymer had the following characteristics:

| | |
| --- | --- |
| 80 wt % ethylene | |
| 20 wt % vinyl acetate | |
| density | 0.94 g/cm³ (ASTMD 1505) |
| Vicat Softening temperature | 42° C |
| melt index | 150 |
| refractive index | 1.492 |

On the other hand, two sheets of stainless steel (40 cm × 40 cm) having substantially flat surfaces maintained at 140° C (the surfaces of which had previously been coated with a release agent, tetrafluoroethylene (Teflon TFE produced by E. I. duPont Co.)) were positioned with a clearance of 0.7 mm therebetween, whereafter three of the edge were plugged to form a mold. Into the clearance so prepared there was poured the above molten mixture, which was allowed to cool down to 120° C in a furnace and thereafter cooled at a cooling rate of 20 deg/min to room temperature. The stainless steel plates were then peeled off carefully to thereby produce a wax sheet.

The thus obtained wax sheet was bonded to the various transparent supports shown in Table 4 to thereby produce rear projection screens.

Table 4

| Rear Projection Screen | Transparent Supports | Transmittance (%) |
| --- | --- | --- |
| No. 1 | Transparent Support A. | 100 |
| No. 2 | Transparent Support B | 64 |
| No. 3 | Transparent Support C | 45 |

Transparent support A was a 2 mm thick (30 cm × 30 cm) acrylic resin plate which was colorless, transparent and had smooth surfaces. Transparent support B was a 2 mm thick (30 cm × 30 cm) colored, transparent, acrylic resin plate with smooth surfaces which had a Mired shift value of −40 (color temperature conversion ability) and was controlled in color tone so as to provide the spectral transmittance curve shown in FIG. 6.

Transparent support C was prepared by further blackening transparent support B spectrally uniformly until the transmittance as a whole reached 45%, i.e., the transmittance due to the coloring was 64% (support B) and the transmittance due to the blackening was 70%; therefore, the transmittance of the transparent support $= 0.64 \times 0.70 = 0.45$ [luminance transmittance under colorimetric standard luminant C].

The optical properties of the thus obtained rear projection screens were measured and the results obtained are shown in Table 5 below.

Table 5

| Optical properties | Rear Projection Screen | | |
| --- | --- | --- | --- |
| | No. 1 | No. 2 | No. 3 |
| Scintillation | Little | Little | Little |
| Image Reproduction Range | 2.2 | 2.3 | 2.4 |
| Light Redistribution Capability ($\theta \frac{1}{2}$) | 21° | 21° | 21° |
| Resolving Power (lines/mm) | 10 or more | 10 or more | 10 or more |
| Color Tone Reproduction Ability | X | Δ | ◎ |

(a) Scintillation

Scintillation is caused by the aggregation of numerous spots of light appearing on a rear projection screen. The spots of light sparkle one by one and it appears as though the aggregation of light-spots moves with the movement of a viewer's eyes. Since scintillation fatigues the eyes of a viewer, it is most desired to reduce the same.

In a micro-optical element, as described, light coming from each element of the micro-optical element is observed as an aggregation of light-spots since they are separatedly and individually visible. While this phenomenon is due to a cause slightly different from that which causes scintillation, in the present invention, however, such light unevenness is included in scintillation.

There is no physical means to evaluate scintillation, as will be understood from the definition thereof, that is, scintillation cannot be expressed numerically, and thus scintillation is usually expressed using a trained individual's subjective measurement.

(b) Image reproduction range

The image reproduction range is a characteristic value which shows the density range in which an image projected on a rear projection screen is reproducible, and is defined by the following equation:

$$\text{Image Reproduction Range} = \log \left( \frac{\text{Maximum Luminance on Screen}}{\text{Minimum Luminance on Screen}} \right)$$

In this case, the maximum luminance varies not only with the characteristics of the screen itself, but also with the intensity of the projection light used to project an image on the screen, and, thus, strictly speaking, the intensity of the image projection light used should be specified.

On the other hand, the minimum luminance is equal to the luminance due to the reflection of room light on the side of the screen which faces an observer. With any rear projection screen, therefore, if it is used in the dark, the minimum luminance is substantially zero, and its image reproduction range becomes widened.

In general, however, since a rear projection screen is used in room light, a reduction to lower levels of minimum luminance through an increase in room light shielding properties is an important factor in providing a desired rear projection screen.

To increase the image reproduction range, it is required that the rear projection screen have a high diffusion transmittance and a low diffusion reflectance. When the former requirement is met, the maximum luminance on the screen increases, whereas when the latter requirement is met, reflection of room light on the surface of the screen decreases, thereby resulting in a decrease in minimum luminance, and, at the same time, loss at the rear of the screen of the image projection light from the projection light source decreases, thereby resulting in an increase in maximum luminance. Therefore, the image reproduction range as a whole increases.

(c) Light redistribution characteristic

This term designates the degree of uniformity with which light is redistributed to the position of the observer (hereinafter referred to as the observation range) when image information is projected onto the screen. This term also designates the degree of uniformity with which light is redistributed through a predefined audience space in such manner that its luminance, viewed from any point in the audience space, is substantially constant.

In general, it is desired that image information be distributed only in the observation range, and, furthermore, uniformly on the screen.

The following two characteristic values are used herein to show the above light redistribution characteristic.

The first characteristic value to show the diffusion characteristic of the screen is the scattering angle of scattering light ($\theta \frac{1}{2}$), i.e., the angle at which the luminance decreases to $\frac{1}{2}$ of that of light emitted vertically from the surface of the screen. The second characteristic value to show the uniformity of screen luminance is the ratio (R) of the luminance at the center of the screen to that at the edge of the screen, the luminance being measured by ISO, R782.

(d) Resolving power

This term designates the number of lines per 1 mm which are resolvable on the screen. The resolving power of the screen should be determined upon considering the resolving power of the human eye, and thus the resolving power of the screen is desirably equal to or more than that of the human eye (7 to 10 lines/mm).

In Table 5, the significance of scintillation, image reproduction range, light redistribution capability, and resolving power is as follows.

The color tone reproduction capability indicates how much the color tone of a color slide film is faithfully reproduced in exterior light of a color temperature of 4,000 Kelvin in the case that the color slide film is reproduced on each rear projection screen by means of a 150 W halogen lamp having a color temperature of 3,400 Kelvin. The symbol "◎" indicates that the color tone reproduced is quite natural, the symbol "Δ" indicates that the color tone reproduced is relatively natural, and the symbol "χ" indicates that the color tone reproduced is unnatural.

Hereafter, these terms have the same meanings, unless otherwise indicated.

With regard to mechnical strength, the wax diffusion layer could be used as it was since the wax modifying agent was added, but it was found that the mechnical strength was markedly improved by bonding it to the acrylic resin plate.

For bonding the wax diffusion layer and the acrylic resin plate, a photocurable composition as shown in Table 2 was used.

It can be understood that rear projection screen No. 3 of the present invention had excellent optical and mechanical properties, and furthermore, was able to naturally and faithfully reproduce color images.

EXAMPLE 5

An ethylene-vinyl acetate copolymer (vinyl acetate content 28 mol%) in an amount of 10 parts by weight was uniformly mixed with and dissolved in 100 parts by weight of a molten synthetic wax (an oligoethylene wax) maintained at 160° C.

The synthetic wax (oligoethylene wax) had the following properties:

| | |
|---|---|
| Melt index | $4 \times 10^3$ |
| Viscosity | 4,300 cp (at 140° C) |
| Softening point | 111° C (JISL 2531/'60) |
| Penetration | 2 JISK 2530/'60 (at 25° C, 100g for 5 sec) |
| Specific gravity | 0.93 (at 20° C, JISK 6760/'66) |

The resulting mixture was spread in a thickness of 0.75 mm on a stainless steel plate with polytetrafluoroethylene coated thereon and having a surface temperature of 100° C, and then it was solidified by cooling the stainless steel plate at a rate of 20 deg/min and then peeled off from the stainless steel to thereby obtain a wax sheet.

The thus obtained wax sheet was bonded to a 2 mm thick (30 cm × 30 cm) acrylic resin plate, which was colorless transparent and had a smooth surface, by the use of a photocurable composition having the composition shown in Table 2 to thereby produce rear projection screen No. 4.

The same wax sheet was bonded to a 2 mm thick (30 cm × 30 cm) acrylic resin plate having a smooth surface in the same manner as in the rear projection screen No. 4 to thereby produce rear projection screen No. 5. The acrylic resin plate was colored to provide color tone having a Mired shift value of −20 (color temperature conversion ability) and until luminous transmittance to colorimetric standard illuminant C reached 65%.

In addition, powdery aluminum oxide having an average particle size of 3 μ was added to a 18% by weight cellulose triacetate dope dissolved in a mixed solvent of 92 parts by weight of methylene chloride and 8 parts by weight of methanol in an amount of 7 parts by weight per 10 parts by weight of cellulose triacetate (molecular weight in the range of 30,000 - 200,000), which was then spread on a glass plate and dried whereby a 190 μ thick dispersion type light diffusion layer was obtained. This light diffusion layer was bonded to the same acrylic resin plate as was used in rear projection screen No. 5 by the used of a photocurable composition having the composition shown in Table 2 to thereby produce rear projection screen No. 6.

The optical properties of the thus obtained rear projection screens were measured, and the results shown in Table 6 were obtained.

Table 6

| Optical Properties | Rear Projection Screen | | |
|---|---|---|---|
| | No. 4 | No. 5 | No. 6 |
| Luminous transmittance under colorimetric standard illuminant C | 80 | 52 | 39 |
| Scintillation | Little | Little | Little |
| Image Reproduction Range | 2.2 | 2.4 | 2.0 |
| Light Redistribution Capability ($\theta \frac{1}{2}$) | 20° | 20° | 21° |
| Resolving Power (lines/mm) | 10 or more | 10 or more | 10 or more |
| Color Tone Reproduction Ability | X* | ⊚* | * |

*See Table 5. The symbol " " indicates that the color tone reproduced is relatively natural.

The color tone reproduction ability indicates how much the color tone of a color slide film is faithfully reproduced in the case that the color slide film is reproduced on each rear projection screen in exterior light of a color temperature of 3,000 Kelvin by means of a 150 W halogen lamp having a color temperature of 2,8000 Kelvin. The luminous transmittance under colorimetric standard illuminant C indicates the visual transmittance of the rear projection screen, including the light diffusion layer, as a whole to colorimetric standard illuminant C.

As is apparent from Table 6, rear projection screen No. 6 using the dispersion type light diffusion layer was markedly high in scintillation, narrow in image reproduction range, and did not have a good color tone reproduction ability. Also, of the rear projection screens using the wax sheet, rear projection screen No. 4 was low in scintillation, but bad in color tone reproduction ability.

On the contrary, rear projection screen No. 5 of the present invention was sufficiently satisfactory in all optical properties such as scintillation, image reproduction range, color tone reproduction ability, etc.

Figure 6:
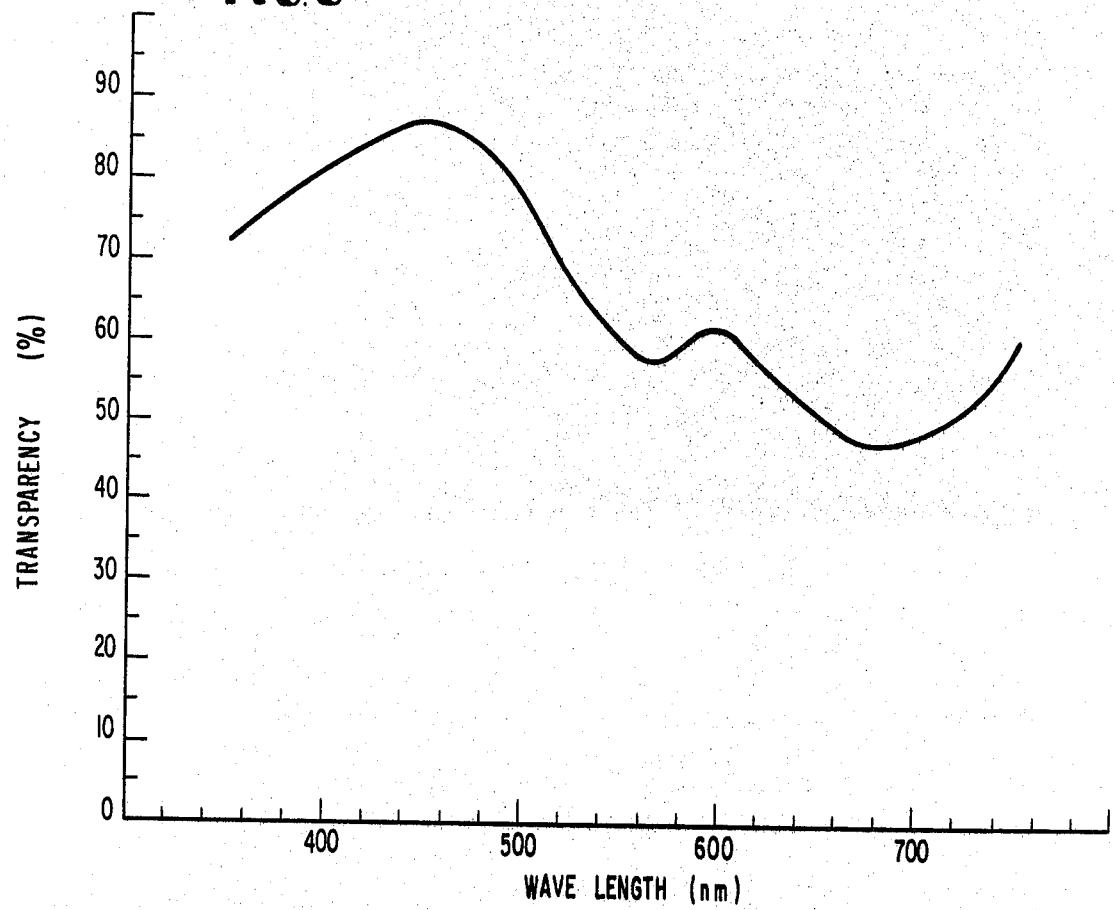
FIG. 6 shows the spectral transmittance curve of the transparent support B used in Example 5 and 8.

FIG. 6 shows the spectral transmittance curve of the transparent support B used in this example.

EXAMPLE 6

Example 6 illustrates an embodiment of the present invention which can be viewed as a more specific embodiment generally illustrated in Examples 4 and 5, i.e., in this embodiment a rear projection screen is utilized which illustrates a Mired value and a transmittance as in Example 4 but where further there is provided a V-groove lenticular lens structure.

Wax sheets were prepared as in Example 4 and sandwiched between the various transparent supports shown in Table 7 following the procedure of Example 4 to produce rear projection screens.

Table 7

| Rear Projection Screen | Support facing Observer | Support facing Light Source |
|---|---|---|
| No. 1 | Transparent Support A | Transparent Support A |
| No. 2 | Transparent Support A | Transparent Support C |
| No. 3 | Transparent | Transparent |

Table 7-continued

| Rear Projection Screen | Support facing Observer | Support facing Light Source |
|---|---|---|
| | Support B | Support C |

Transparent support A was a 2 mm thick (30 cm × 30 cm) colorless transparent acrylic resin plate having a smooth surface. Transparent support B was a 2 mm thick (30 cm × 30 cm) colored, transparent acrylic resin plate having color temperature conversion ability of −40 Mired, the color tone being controlled so as to provide the spectral transmission curve shown in FIG. 8, and a smooth surface.

Transparent support C was a 0.2 mm thick (30 cm × 30 cm) acrylic resin plate having a V-groove structure as disclosed in U.S. patent application Ser. No. 654,830 filed on Feb., 1976 on the surface thereof facing the light source, the V-groove structure being one-dimensional and having a pitch of 0.1 mm and a vertical angle of 122°. The pitch, of course, is in this instance the distance between adjacent apexes of the triangles (V-groove) and the "top angle" (which can be viewed as a vertical angle) is the angle at the apex of the triangle (V-groove).

The optical properties of the thus obtained rear projection screens were measured and the results obtained are shown in Table 8.

Table 8

| Optical Properties | Rear Projection Screen | | |
|---|---|---|---|
| | No. 1 | No. 2 | No. 3 |
| Scintiallation | Little | Little | Little |
| Image Reproduction | 2.3 | 2.3 | 2.4 |
| Light Redistribution Capability ($\theta_{\frac{1}{2}}$) | 15° | ∥ 30° ⊥15° | ∥ 30° ⊥15° |
| Resolving Power (lines/mm) | 10 or more | 10 or more | 10 or more |
| Color Tone Reproduction Capability | X | X | ◉ |

The significance of the scintillation, image reproduction reange, light redistribution capability, and resolving power in Table 8 is the same as described in U.S. patent application Ser. No. 654,830 filed on Feb. 3, 1976. The symbol " ∥ " designates the light redistribution capability in the horizontal direction, and the symbol "⊥" in the vertical direction.

The color tone reproduction capability indicates how much the color tone of a color slide film is faithfully reproduced in the case that the color slide film is reproduced on each rear projection screen by means of a 150 W halogen having a color temperature of 2,800° K. The symbol "◉" indicates that the color tone reproduced is quite natural and the symbol "χ" indicates that the color tone reproduced is unnatural.

As is apparent from Table 8, since the light redistribution capability of Nos. 2 and 3 in the horizontal direction is two times that of No. 1, many viewers can look at the same image at hte same time. Furthermore, since the rear projection screen No. 3 of the present invention had a color temperature conversion ability as well as the micro-optical element structure, the light redistribution capability in the horizontal direction was wide, and moreover, it was possible to obtain reproduced image having a natural color tone.

EXAMPLE 7

Example 7, in a manner similar to Example 6, can be viewed as a more specific embodiment of the rear projection screen illustrated in Examples 4 and 5, i.e., having a certain Mired value in a certain transmittance and further having a V-groove lenticular lens structure. Whereas Example 6 illustrated the use of a wax light diffusion layer, Example 7 illustrates the use of a crystalline polymer light diffusion layer.

A low density polyethylene (density 0.92) of a molecular weight of 20,000 was melted under a nitrogen gas atmosphere at 200° C, and defoamed at $10^{-2}$ Torr for 10 minutes. Then, the vacuum was replaced with nitrogen gas, and the pressure was allowed to rise to ordinary pressure. The resulting molten polyethylene was injected into a 30 cm × 30 cm × 0.7 mm sheet-like metal mold at 200° C, gradually cooled down to 120° C (in this regard, the cooling rate has no substantial inpact upon the product characteristics and is not limited), and then rapidly cooled by spraying water at 25° C against the mold. After being completely cooled, the polyethylene sheet was taken out of the mold, and thus a crystalline polymer light diffusion layer was obtained.

The thus obtained polyethylene sheet was sandwished between various transparent supports as shown in Table 10 in the same manner as in Example 2 to thereby produce a rear projection screen.

Table 9

| Rear Projection Screen | Support Facing Observer | Support Facing Light Source |
|---|---|---|
| No. 1 | Transparent Support A | Transparent Support A |
| No. 2 | Transparent Support A | Transparent Support C |
| No. 3 | Transparent Support B | Transparent Support C |

The V-groove structure was one-dimensional and had a pitch of 0.1 mm and a vertical angle of 122°.

The optical properties of the thus obtained rear projection screens were measured and the results obtained are shown in Table 10.

Table 10

| Optical Properties | Rear Projection Screen | | |
|---|---|---|---|
| | No. 1 | No. 2 | No. 3 |
| Scintillation | slightly present | slightly present | slightly present |
| Image Reproduction Range | 2.0 | 2.0 | 2.1 |
| Light Redistribution Capability ($\theta_{\frac{1}{2}}$) | 15° | ∥ 30° ⊥15° | ∥ 30° ⊥15° |
| Resolving Power (lines/mm) | 10 or more | 10 or more | 10 or more |
| Color Tone Reproducing Ability | X | X | ◉ |

The significance of the scintiallation, image reproduction range, light redistribution capability, and resolving power in Table 10 is the same as described in U.S. patent application Ser. No. 654,830 filed on Feb. 3, 1975. The symbol " ∥ " designates the light redistribution capability in the horizontal direction, and the symbol "⊥", the one in the vertical direction.

The color tone reproduction capability indicates how much the color tone of the color slide film is faithfully reproduced in the outer light having a color temperation of 4,000 Kelvin in the case that the color slide film is reproduced on each rear projection screen by means of a 150 W halogen lamp having a color temperature of 3,400 Kelvin. The symbol "⊙" indicates that the color tone reproduced is felt quite natural, and the symbol "χ" indicates that the color tone reproduced is felt unnatural.

As apparent from Table 10, the light redistribution capability of Nos. 2 and 3 in the horizontal direction is two times that of No. 1. Furthermore, since the rear projection screen No. 3 of the present invention had a color temperature conversion ability as well as the micro-optical element structure, the light redistribution capability in the horizontal direction was wide, and moreover, it was possible to produce an image having natural color tone.

Figure 8:
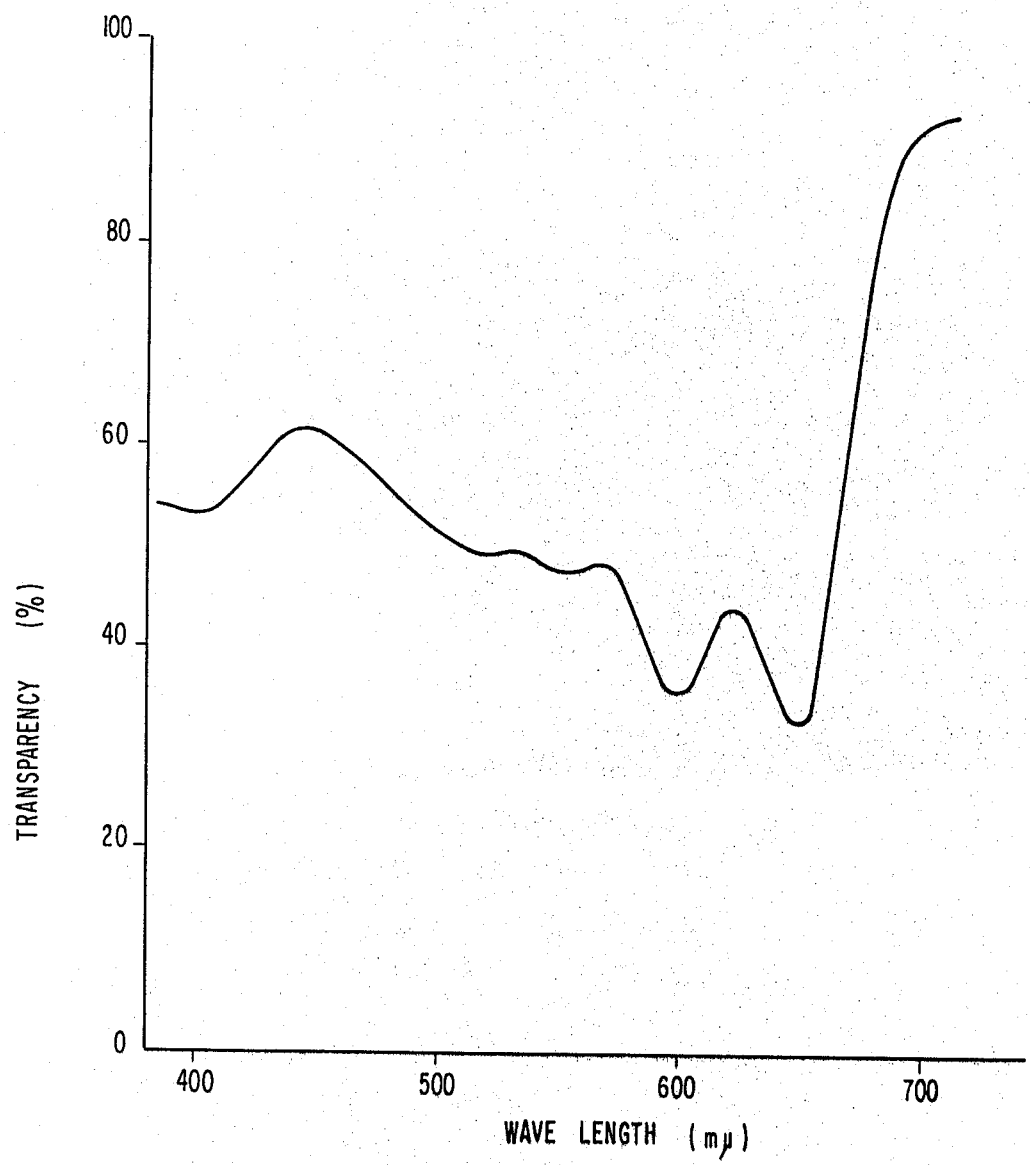
FIG. 8 is the spectral transmission curve of the transparent support used in Example 6.

It should be noted that FIG. 8 would also, of course, show the spectral transmission curve of the transparent support used in Example 7.

EXAMPLE 8

This example illustrates as embodiment of the present invention wherein a V-grooved lenticular lens structure is directly formed on the surface of a crystalline polymer light diffusion layer. Following the procedure of Example 7, a crystalline polymer diffusion layer A was obtained.

An otherwise identical crystalline polymer diffusion layer was then press molded at a temperature of 110° C and a pressure of 50 Kg/cm² using a mold which had been formed by molding so as to have a V-grooved lenticular lens stracture with a vertical angle of 120° and a repeated pitch of 100 μ, thus forming crystalline polymer diffusion layer B.

Crystalline polymer diffusion layers A and B thus obtained were respectively bonded to various transparent supports following the procedure of Example 2 as shown in Table 11 to form rear projection screens Nos. 1, 2, 3 and 4.

Table 11

| Rear Projection Screen | Crystalline Polymer Sheet | Transparent Sheet |
|---|---|---|
| No. 1 | A | a |
| No. 2 | B | a |
| No. 3 | B | b |
| No. 4 | B | c |

In Table 1, transparent support (a) refers to a colorless, transparent acrylic sheet (30 cm + 30 cm) 2 mm thick having a smooth surface, transparent support b) refers to a colored transparent acrylic sheet (30 cm × 30 cm) 2 mm thick which had color tone controlled so as to have a color temperature converting capability of −40 (Mired shift value and so as to have a spectral transmittance curve as shown in FIG. 6), and transparent sheet (c) refers to a sheet identical to transparent sheet (b) which was further treated by spectrally uniformly blackening so as to show a luminous transmittance with illuminant C of 45% as a whole (the blackening providing a luminous transmittance with illuminant C of 70%).

The optical properties of the rear projection screens thus obtained were examined, and the results shown in Table 12 were obtained.

Table 12

| Rear Projection Screen Characteristics | No. 1 | No. 2 | No. 3 | No. 4 |
|---|---|---|---|---|
| Luminous Transmittance with Illuminant C | 80% | 80% | 51% | 36% |

Table 12-continued

| Rear Projection Screen Characteristics | No. 1 | No. 2 | No. 3 | No. 4 |
|---|---|---|---|---|
| Scintillation | slight | slight | slight | slight |
| Image Reproduction Range | 2.0 | 1.9 | 1.9 | 2.0 |
| Light-redistribution Capability | 16° | Transverse direction 32° vertical direction 16° | | |
| Resolving Power (lines/mm) | more than 10 | more than 10 | more than 10 | more than 10 |
| Color Tone Reproducibility | X | X | Δ | ⊙ |

In Table 12, the meanings of scintillation, image eproduction range, light-redistribution capability and resolving power are the same as earlier disclosed in Example 5.

"Color tone reproducibility" refers to how faithfully the color tone of a color slide film is reproduced under a room light having a color temperature of 4000° Kelvin when the color slide film is projected on each of the rear projection screens using a 150 W halogen lamp light source having a color temperature of 3400° Kelvin, "⊙" denoting the reproduced color tone looked natural, "Δ" the color tone was relatively good, and "χ" the color tone looked unnatural.

With respect to mechanical strength, it can be seen that it was remarkably increased by bonding the crystalline polymer diffusion layer to the acrylic sheet.

The bonding of the crystalline polymer diffusion layer to the acrylic sheet was carried out in the manner disclosed in Example 2.

As is obvious from Table 12, rear projection screens No. 3 and No. 4 of this invention were excellent in optical properties, and, in particular, had the following outstanding advantages:

(i) Since diffusion capability is high only in the transverse direction, light insident to the rear projection screen is effectively used so that a plurality of viewers can simultanously observe a uniform and bright image.

(ii) Color images were faithfully reproduced.

EXAMPLE 9

This example is similar to Example 8 in illustrating the use of a V-groove lenticular lens structure directly formed on a diffusion layer but, in this case, the light diffusion layer is a wax diffusion layer.

Following the procedure of Example 2, a wax diffusion layer A was obtained. Next, an identical sample of wax diffusion layer A was press-molded at a temperature of 90° C and a pressure of 50 kg/cm² using a mold which had been formed by molding so as to have a V-grooved lenticular lens structure with a vertical angle of 120° and a repeated pitch of 100 μ, thus forming a wax type diffusion layer B.

Wax type diffusion layers A and B thus obtained were respectively bonded to various transparent supports as shown in Table 13 to form rear projection screens Nos. 1, 2, 3 and 4 in a manner similar to Example 2.

Table 13

| Rear Projection Screen | Wax Sheet | Transparent Support |
|---|---|---|
| No. 1 | A | a |
| No. 2 | B | a |
| No. 3 | B | b |
| No. 4 | B | c |

In Table 13, transparent support (a) refers to a colorless, transparent acrylic sheet (30 cm × 30 cm) 2 mm thick having a smooth surface, transparent support (b) refers to a colored transparent acrylic sheet (30 cm × 30 cm) 2 mm thick which had its color tone controlled so as to have a color temperature converting capability of −40 (Mired shift value) and so as to have a spectral transmittance curve as shown in FIG. 6, and transparent support (c) refers to transparent support (b) which was further treated by spectrally uniformly blackening so as to show a luminous transmittance with illuminant C of 45% as a whole (the blackening providing a luminous transmittance with illuminant C of 70%).

The optical properties of the rear projection screens thus obtained were examined, and the results shown in Table 14 were obtained.

Table 14

| Rear Projection Screen Characteristics | No. 1 | No. 2 | No. 3 | No. 4 |
|---|---|---|---|---|
| Luminous Transmittance with Illuminant C | 80% | 80% | 51% | 36% |
| Scintillation | scarcely | scarcely | scarcely | scarcely |
| Image Reproduction Range | 2.4 | 2.2 | 2.2 | 2.3 |
| Light-Redistribution | 17° | transverse direction 34° vertical direction 17° | | |
| Resolving Power (lines/mm) | more than 10 | more than 10 | more than 10 | more than 10 |
| Color Tone Reproducibility | X | X | Δ | ◉ |

In Table 14, the meanings of scintillation, image reproduction range, light-redistribution capability and resolving power are the same as disclosed in U.S. Ser. No. 654,830 filed Feb. 3, 1976.

The "color tone reproducibility" refers to how faithfully the color tone of a color slide film is reproduced as in Example 8, the meanings being the same as disclosed in Example 8.

With respect to mechanical strength, the wax type diffusion layer could be used alone because the wax reforming agent was added, but mechanical strength was remarkably increased by bonding it to the acrylic sheet.

The bonding of the wax type diffusion layer to the acrylic sheet was carried out as disclosed in Example 2.

As is obvious from Table 14, rear projection screens No. 3 and No. 4 of this invention were excellent in optical properties, and in particular, had the outstanding advantages obtained in Example 8.

FIG. 6 shows the spectral transmission distribution curve of the transparent support (b) used in this example.

EXAMPLE 10

This Example illustrates an embodiment of the present invention wherein a Fresnel lens structure is directly fromed on a light diffusion layer, in this case a crystalline polymer light diffusion layer.

Following the procedure of Example 7, a crystalline polymer diffusion layer A was obtained.

Next, an identical sample of crystalline polymer diffusion layer A was press molded at a temperature of 110° C and a pressure of 50 kg/cm² using a female mold of a Fresnel lens of concentric circles having a pitch of 20 μ and a focal length of 40 cm, thus making a crystalline polymer diffusion layer B having a Fresnel lens structure.

The crystalline polymer diffusion layer A and B thus obtained were respectively bonded to various transparent supports, following the procedure of Example 7, as shown in Table 15 to form rear projection screens Nos. 1, 2, 3 and 4.

Table 15

| Rear Projection Screen | Crystalline Polymer Sheet | Transparent Support |
|---|---|---|
| No. 1 | A | a |
| 2 | B | a |
| 3 | B | b |
| 4 | B | c |

In Table 15, transparent support (a) refers to a colorless, transparent acrylic sheet (30 cm × 30 cm) 2 mm thich having a smooth surface, transparent support (b) refers to a colored transparent acrylic sheet (30 cm × 30 cm) 2 mm thick which has color tone controlled so as to have a color temperature converting capability of −40 (Mired shift value) and a spectral transmittance curve as shown in FIG. 6, and transparent support (c) refers to transparent support (b) which is further treated by spectrally uniformly blackening so as to show a luminous transmittance with illuminant C of 45% as a whole (the blackening providing a luminous transmittance with illuminant C of 70%).

The optical properties of the rear projection screens thus obtained were examined, and the results shown in Table 16 were obtained.

Table 16

| Rear Projection Screen Characteristics | No. 1 | No. 2 | No. 3 | No. 4 |
|---|---|---|---|---|
| Luminous Transmittance with Illuminant C | 80% | 80% | 51% | 36% |
| Scintillation | slightly | slightly | slightly | slightly |
| Image Reproduction Range | 2.0 | 2.0 | 2.0 | 2.1 |
| Light-Redistribution Capability (R)* | 5.7 | 1.6 | 1.6 | 1.6 |
| Resolving Powder (lines/mm) | more than 10 | more than 10 | more than 10 | more than 10 |
| Color Tone Reproducibility | X | X | Δ | ◉ |

*Expressed in terms of the ratio of the luminance of the center to that of the periphery of the rear projection screen as measured by the method described in ISO . R 782. The smaller the value, the more uniform is the brightness of the rear projection screen.

In Table 16, the meanings of scintillation, image reproduction range, light-redistribution capability and resolving power are the same as disclosed in Japanese Patent Application 14,541/75.

The "color tone reproducibility" refers to how faithfully the color tone of a color slide film is reproduced under a room light as described in Example 8 wherein the same definitions are used for the symbols.

It can be seen that mechanical strength was remarkably increased by bonding the crystalline polymer diffusion layer to the acrylic sheet.

The bonding of the crystalline polymer diffusion layer to the acrylic sheet was carried out as disclosed in Example 2.

As earlier described, rear projection screens No. 3 and No. 4 of this invention have excellent optical properties, and, in particular, have the following outstanding advantages:

(i) In the case of the viewing by a single viewer, since the rays from the light source can be collected on the viewing point where the viewer stands and thus effectively used, a bright image with uniform brightness all over the rear projection screen is obtained.

(ii) Color images are faithfully reproduced.

EXAMPLE 11

This Example is a further exemplification of the embodiment of the present invention illustrated in Example 10, except that in this Example a wax light diffusion layer is utilized with a Fresnel lens structure formed thereon.

Following the procedure of Example 2, a wax type diffusion layer A was obtained.

An identical sample of wax diffusion layer A was press molded at a temperature of 90° C and a pressure of 50 Kg/cm$^2$ using a female mole of a Fresnel lens of concentric circles having a pitch of 200 $\mu$ and a focal length of 40 cm, thus making a wax diffusion layer B having a Fresnel lens structure.

Wax diffusion layers A and B thus obtained were respectively bonded to various transparent supports, following the procedure of Example 2, as shown in Table 17 to form rear projection screens Nos. 1, 2, 3 and 4.

Table 17

| Rear Projection Screen | Wax Sheet | Transparent Support |
|---|---|---|
| No. 1 | A | a |
| 2 | B | a |
| 3 | B | b |
| 4 | B | c |

In Table 17, transparent support (a) refers to a colorless, transparent acrylic sheet (30 cm × 30 cm) 2 mm having a smooth surface, transparent support (b) refers to a colored transparent acrylic sheet (30 cm × 30 cm) 2 mm thick which has its color tone controlled so as to have a color temperature converting capability of −40 (Mired shift value) and to have a spectral transmittance curve as shown in FIG. 6, and transparent support (c) refers to transparent support (b) which is further treated by spectrally uniformly blackening so as to show a luminous transmittance with illuminant C of 45% as a whole (the blackening providing a luminous transmittance with illuminant C of 70%).

The optical properties of the rear projection screens thus obtained were examined, and the results shown in Table 18 were obtained.

Table 18

| Rear Projection Screen Characteristics | No. 1 | No. 2 | No. 3 | No. 4 |
|---|---|---|---|---|
| Luminous Diffuse Transmittance with Illuminant C | 80% | 80% | 51% | 365 |
| Scintillation | scarcely | scarcely | scarcely | scarcely |
| Image Reproduction Range | 2.4 | 2.4 | 2.4 | 2.5 |
| Light-Redistribution capability (R)* | 5.7 | 1.6 | 1.6 | 1.6 |
| Resolving Power (lines/mm) | more than 10 | more than 10 | more than 10 | more than 10 |
| Color Tone Reproductibility | X | X | Δ | ⊚ |

*As defined in Example 10.

With respect mechanical strength, the wax diffusion layer could be used alone because a wax reforming agent was added, but it can be seen that mechanical strength was remarkebly increased by bonding it to the acrylic sheet.

The bonding of the wax type diffusion layer to the acrylic sheet was carried as disclosed in Example 2.

Rear projection screens No. 3 and No. 4 of this invention had excellent optical properties, and, in particular, had the outstanding advantages of Example 10.

EXAMPLE 12

This example illustrates an embodiment of the present invention wherein flexible film-like supports are used having a thickness of less than about 0.5 mm and wherein a crystalline polymer light diffusion layer is utilized, enabling one to obtain a rear projection screen which can be used for various purposes, is of high durability and which can be produced with ease. Following the procedure of Example 7 a polymer diffusion layer was obtained.

Cellulose triacetate films having a thickness of 180 $\mu$ were bonded to both sides of the polyethylene sheet prepared above through intermediate layers in the same manner as in Example 1.

The thus obtained sandwich type rear projection acreen was produced with ease, was flexible, and moreover, was resistant to variations in temperature.

EXAMPLE 13

This example is a further specific illustration of the embodiment wherein flexible supports less than about 0.5 mm thick are used, except that in this example a wax light diffusion layer is used as opposed to the polymer diffusion layer of Example 12, both of which are highly preferred aspects of this particular embodiment of the present invention.

Following the procedure of Example 4, a wax sheet was formed: to both sides of the above wax sheet were bonded cellulose triacetate films having a thickness of 180 $\mu$ in the same manner as in Example 1 (intermediate layers used).

The thus obtained sandwich type rear projection screen was produced with ease, was flexible and was resistant to variations in temperature.

While the invention has been described in detail and with reference to specific embodiments thereof, it will be apparent to one skilled in the art that various changes and modifications can be made therein without departing from the spirit and scope thereof.

What is claimed is:

1. A rear projection screen comprising at least one light diffusion layer and at least one transparent support which are bonded via an intermediate layer formed from a photocurable composition.

2. A rear projection screen as claimed in claim 1, wherein said light diffusion layer comprises components selected from the group of: wax, a crystalline polymer, and wax and a crystalline polymer.

3. A rear projection screen as claimed in claim 2, wherein said photocurable composition is liquid.

4. A rear projection screen as claimed in claim 3, wherein said liquid photocurable composition contains components selected from the group of: A, B, and A and B where A is one or more photopolymerizable monomers, and B is one or more photopolymerizable oligomers.

5. A rear projection screen as claimed in claim 4, wherein said photocurable composition comprises at least one compound containing one or more ethylenically unsaturated double bonds.

6. A rear projection screen as claimed in claim 5, wherein said rear projection screen is colored until its color temperature conversion capability reaches a color tone having a Mired shift value of about −5 to about —120 and the rear projection screen, as a whole, has a transmittance of about 40 to about 70%.

7. A rear projection screen as claimed in claim 6, wherein said light diffusion layer is a wax.

8. A rear projection screen as claimed in claim 6, wherein said light diffusion layer is a crystalline polymer.

9. A rear projection screen as claimed in claim 5, wherein said light diffusion layer has a V-groove lenticular lens structure with a pitch of from about 0.03 to about 1 mm and a top angle of from about 90° to about 150° on the side thereof which is to face a light source during use.

10. A rear projection screen as claimed in claim 9, wherein said light diffusion layer is wax.

11. A rear projection screen as claimed in claim 9, wherein said light diffusion layer is a crystalline polymer.

12. A rear projection screen as claimed in claim 5, wherein said light diffusion layer has a Fresnel lens structure with a pitch of from about 0.03 mm to about 1 mm and a focal length of from about 20 cm to about 100 cm on the side thereof which is to face a light source during use.

13. A rear projection screen as claimed in claim 12, wherein said light diffusion layer is a wax.

14. A rear projection screen as claimed in claim 12, wherein said light diffusion layer is a crystalline polymer.

15. A rear projection screen as claimed in claim 5 having the following stratum arrangement: transparent support; layer formed from a photocurable composition; light diffusion layer; layer formed from a photocurable composition; transparent support; wherein said supports have a thickness of not more than about 0.5 mm.

16. A rear projection screen as claimed in claim 15, wherein said light diffusion layer is a wax.

17. A rear projection screen as claimed in claim 15, wherein said light diffusion layer is a crystalline polymer.

* * * * *